US012742035B2

(12) United States Patent
Mehravar et al.

(10) Patent No.: US 12,742,035 B2
(45) Date of Patent: Sep. 22, 2026

(54) AQUEOUS SELF-CROSSLINKABLE POLYURETHANE DISPERSIONS

(71) Applicant: BASF SE, Ludwigshafen am Rhein (DE)

(72) Inventors: Samane Mehravar, Ludwigshafen am Rhein (DE); Paola Uribe Arocha, Ludwigshafen am Rhein (DE); Daniel Von Nessen, Ludwigshafen am Rhein (DE); Konrad Roschmann, Ludwigshafen am Rhein (DE); Florian Ludwig Geyer, Ludwigshafen am Rhein (DE); Mo Kit Chau, Ludwigshafen (DE); Florian Schluetter, Ludwigshafen am Rhein (DE); Juergen Kaczun, Ludwigshafen am Rhein (DE); David Tuerp, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 574 days.

(21) Appl. No.: 18/027,677

(22) PCT Filed: Sep. 14, 2021

(86) PCT No.: PCT/EP2021/075208
§ 371 (c)(1),
(2) Date: Mar. 22, 2023

(87) PCT Pub. No.: WO2022/063638
PCT Pub. Date: Mar. 31, 2022

(65) Prior Publication Data

US 2023/0374192 A1 Nov. 23, 2023

(30) Foreign Application Priority Data

Sep. 25, 2020 (EP) .................................... 20198518

(51) Int. Cl.
*C08G 18/42* (2006.01)
*C08G 18/32* (2006.01)
(Continued)

(52) U.S. Cl.
CPC ..... *C08G 18/4241* (2013.01); *C08G 18/3206* (2013.01); *C08G 18/3228* (2013.01);
(Continued)

(58) Field of Classification Search
None
See application file for complete search history.

(56) References Cited

U.S. PATENT DOCUMENTS 4,983,662 A 1/1991 Overbeek et al.
5,147,926 A * 9/1992 Meichsner ........... C09D 11/102 524/839

(Continued)

FOREIGN PATENT DOCUMENTS

CN 101516950 A 8/2009
CN 103189372 A 7/2013

(Continued)

OTHER PUBLICATIONS

International Search Report and Written Opinion received for PCT Patent Application No. PCT/EP2021/075208, mailed on Jan. 19, 2022, 8 pages.
European Search Report for EP Patent Application No. 20198518.1, Issued on Mar. 12, 2021, 3 pages.
International Preliminary Report on Patentability received for PCT Patent Application No. PCT/EP2021/075208, mailed on Apr. 6, 2023, 7 pages.
Liao, et al., "Synthesis and characterization of ambient-temperature self-crosslinked waterborne polyurethanes with a novel diol chain extender bearing two ketone groups", Journal of Coatings Technology and Research, vol. 13, Issue 4, Apr. 12, 2016, pp. 667-676.

*Primary Examiner* — Monique R Jackson
(74) *Attorney, Agent, or Firm* — Faegre Drinker Biddle & Reath LLP

(57) ABSTRACT

The present invention relates to polyester polyols (1) carrying at least one keto-type C═O group derived from HO—C(═O)—$L^1$-C(═O)—$R^1$ (1*i*) or from a derivative thereof, wherein $L^1$ is a linking group and $R^1$ is selected from the group consisting of $C_{1-20}$-alkyl, $C_{5-8}$-cycloalkyl, $C_{6-10}$-aryl and $C_{7-20}$-aralkyl, to aqueous polyurethane dispersions (PUD) comprising at least one polyurethane (2) carrying at least one keto-type C═O group, water, and optionally at least one organic solvent (4), wherein the at least one polyurethane (2) carrying at least one keto-type C═O group comprises units derived from at least one polyester polyol (1), to aqueous self-crosslinkable polyurethane dispersions (SC-PUD) comprising at least one polyurethane (2) carrying at least one keto-type C═O group, at least one compound (3) carrying at least two keto-type C═O group reactive groups, water, and optionally at least one organic solvent (4), wherein the at least one polyurethane (2) carrying at least one keto-type C═O group comprises units derived from at least one polyester polyol (1), to aqueous self-crosslinkable polyurethane coating composition comprising the aqueous self-crosslinkable polyurethane dispersion (SC-PUD) optionally at least one organic solvent (5), at least one coating composition additive (6), optionally at least one polymer (7) different from the polyurethane (2), and optionally at least one monomer (8) carrying at least one olefinically unsaturated group, to substrate coated with the aqueous self-crosslinkable polyurethane coating composition, and to a process for coating the substrate with the aqueous self-crosslinkable polyurethane coating composition.

13 Claims, No Drawings

(51) Int. Cl.

| | |
|---|---|
| ***C08G 18/34*** | (2006.01) |
| ***C08G 18/66*** | (2006.01) |
| ***C08G 18/75*** | (2006.01) |
| ***C08G 63/20*** | (2006.01) |
| ***C08G 63/91*** | (2006.01) |
| ***C08K 5/25*** | (2006.01) |
| ***C09D 7/20*** | (2018.01) |
| ***C09D 7/63*** | (2018.01) |
| ***C09D 15/00*** | (2006.01) |
| ***C09D 175/12*** | (2006.01) |

(52) U.S. Cl.

CPC ..... *C08G 18/3234* (2013.01); *C08G 18/3275* (2013.01); *C08G 18/348* (2013.01); *C08G 18/4202* (2013.01); *C08G 18/4216* (2013.01); *C08G 18/6659* (2013.01); *C08G 18/755* (2013.01); *C08G 63/20* (2013.01); *C08G 63/916* (2013.01); *C08K 5/25* (2013.01); *C09D 7/20* (2018.01); *C09D 7/63* (2018.01); *C09D 15/00* (2013.01); *C09D 175/12* (2013.01)

(56) References Cited

U.S. PATENT DOCUMENTS

| | | | | |
|---|---|---|---|---|
| 7,045,573 | B2 * | 5/2006 | Mayer | C09D 175/04 2/167 |
| 9,133,364 | B2 * | 9/2015 | Reidlinger | C09D 175/12 |
| 2006/0264568 | A1 | 11/2006 | Pajerski | |
| 2007/0093594 | A1 | 4/2007 | Schafheutle et al. | |
| 2008/0027168 | A1 | 1/2008 | Pajerski | |
| 2010/0330375 | A1 * | 12/2010 | Pajerski | C09D 175/04 524/590 |
| 2012/0121911 | A1 | 5/2012 | Mullen et al. | |
| 2017/0335057 | A1 * | 11/2017 | Tabor | C08G 18/4252 |

FOREIGN PATENT DOCUMENTS

| | | | | |
|---|---|---|---|---|
| EP | 3712190 | A1 | 9/2020 | |
| WO | WO-2005097858 | A1 * | 10/2005 | C08G 18/0866 |
| WO | 2006/086322 | A1 | 8/2006 | |
| WO | 2008/016843 | A1 | 2/2008 | |
| WO | 2009/105400 | A1 | 8/2009 | |
| WO | 2013/153093 | A1 | 10/2013 | |
| WO | 2015/030955 | A1 | 3/2015 | |

* cited by examiner

AQUEOUS SELF-CROSSLINKABLE POLYURETHANE DISPERSIONS

CROSS-REFERENCE TO RELATED APPLICATIONS

This application is a National stage application (under 35 U.S.C. § 371) of PCT/EP2021/075208, filed Sep. 14, 2021, which claims benefit of European Application No. 20198518.1, filed Sep. 25, 2020, both of which are incorporated herein by reference in their entirety.

The present invention relates to a polyester polyol carrying at least one keto-type C=O group, to aqueous polyurethane dispersion comprising at least one polyurethane carrying at least one keto-type C=O group derived from the polyester polyol, to aqueous self-crosslinkable polyurethane dispersion comprising at least one polyurethane carrying at least one keto-type C=O group derived from the polyester polyol, an aqueous self-crosslinkable polyurethane coating composition comprising the aqueous self-crosslinkable polyurethane dispersion, a process for coating a substrate, to a substrate coated with the aqueous self-crosslinkable coating composition and to a process for coating the substrate.

Aqueous self-crosslinkable polyurethane coating composition, in particular those for coating interior wood substrates such as parquet flooring, ideally contain only a low amount of organic solvent, and are able to crosslink at low temperatures such as room temperature without addition of an external crosslinker under formation of a homogeneous crack-free film.

Aqueous self-crosslinkable polyurethane coating composition are known in the art.

U.S. Pat. No. 4,983,662 describes an aqueous self-crosslinkable coating composition suitable for coating wood, metal, fabrics and plastics comprising an aqueous dispersion which comprises at least one polyurethane polymer, wherein said composition has hydrazine (or hydrazone) functional groups and carbonyl functional groups present in the composition to provide a selfcrosslinking reaction, in which said at least polyurethane polymer takes part, via azomethine formation from the reaction of hydrazine (or hydrazone) functional groups and carbonyl functional groups during and/or after film formation from the aqueous composition of at least one polyurethane. In one embodiment (X(C)) the polyurethane bears chain-pendant carbonyl functional groups and the composition includes a non-polyurethanic, non-vinylic polyhydrazine compound. Example 1 describes an aqueous self-crosslinkable coating composition containing polytetrahydrofuran-based polyurethane having pendant carbonyl-functional groups formed from dihydroxyacetone, as well as adipic acid dihydrazide and an acrylic copolymer. Example 2 describes an aqueous-based self-crosslinkable coating composition containing a polytetrahydrofuran-based polyurethane having pendant carbonyl-functional groups formed from the adduct of diethanolamine with diacetoneacrylamide, as well as adipic acid dihydrazide (ADDH).

US20070093594 describes self-crosslinkable aqueous polyurethane dispersions containing a crosslinking agent selected from diamines and dihydrazides, and polyurethanes containing a carbonyl group derived from compound F. Compound F contains at least one group which is reactive towards isocyanate and at least one aldehyde-type or ketone-type carbonyl group.

WO2006086322 describes an aqueous dispersion of polyurethane including co-reactive mole-cules/oligomers of a) a ketone functional moiety/molecule and b) a hydrazine functional moiety useful in a variety of applications including coatings such as wood floor coatings. Examples of ketone functional molecules are i) the product of bisphenol A diglycidyl ether and levulinic acid, (example A) and the product of bisphenol A diglycidyl ether, levulinic acid, benzyl benzoate and 1,6-hexane diisocyanate (example B), and the product of 1,1,1-tris(hydroxymethyl) propane, levulinic acid and isophorone diisocyanate (example D).

WO2008016843 describes an aqueous dispersion of polyurethane including co-reactive mole-cules/oligomers of a) a ketone functional moiety/molecule and b) a hydrazine functional moiety useful in a variety of applications including coatings such as wood floor coatings. A preferred ketone molecule is the reaction product of levulinic acid with epoxides of linseed or soybean oil. The ketone functional moieties are introduced into the reaction mixture at any time during polyurethane prepolymer or polyurethane formation when they can be uniformely dispered, in one embodiment this is before the prepolymer is dispersed in water. The hydrazine functional moieties are typically added after dispersion and/or chain extension. Exemplified dispersion 2 is an aqueous dispersion containing a polyester-based polyurethane, a ketone-functional molecule derived from levulinic acid and epoxidized lineseed oil, and adipic acid dihydrazide (ADDH). The dispersion is suitable for wood floor coating.

WO2009105400 describes aqueous polyurethane dispersions made from urethane prepolymers comprising one or more polyhydroxy compounds from ketone functional molecules derived from epoxidized natural oil. Addition of a hydrazine functional moiety to the prepolymer dispersion can provide crosslinking in the formation of azomethine linkages in the resulting polyurethane during drying. The polyhydroxy compound can be a ketone-functional molecule derived from levulinic acid and epoxidized vegetable oil. The dispersions are suitable for wood flooring.

WO2013153093 describes a process for preparing Schiff-base crosslinkable aqueous polyurethane dispersions, which does not involve the use of volatile amines. Example 1 describes an aqueous polyurethane acrylic hybrid dispersion, wherein the polyurethane comprises a keto polyester-polyol as synthesis component, and adipic acid dihydrazide.

WO2015030955 describes aqueous dispersions of a self-crosslinkable polymer comprising urethane as well as hydrazide units.

It was the object of the present invention to provide aqueous self-crosslinkable polyurethane coating compositions which show good film-forming behavior.

This object is solved by the polyester polyol, the aqueous polyurethane dispersion, aqueous self-crosslinkable polyurethane dispersion, the aqueous self-crosslinkable polyurethane coating composition, the substrate, and the process as disclosed herein.

The polyester polyols of the present invention is a polyester polyol (1) carrying at least one keto-type C=O group derived from HO—C(=O)-$L^1$-C(=O)—$R^1$(1i) or from a derivative thereof, wherein $L^1$ is a linking group and $R^1$ is selected from the group consisting of $C_{1-20}$-alkyl, $C_{5-8}$-cycloalkyl, $C_{6-10}$-aryl and $C_{7-20}$-aralkyl.

Derivatives of HO—C(=O)-$L^1$-C(=O)—$R^1$(1i) are the corresponding anhydride, esters, amides and acid halides. Preferred derivatives of HO—C(=O)-$L^1$-C(=O)—$R^1$ (1i) are the corresponding esters of formula $R^3$O—C(=O)-$L^1$-C(=O)—$R^1$ (1i'), wherein $R^3$ is selected from the group consisting of $C_{1-20}$-alkyl, $C_{5-8}$-cycloalkyl, $C_{6-10}$-aryl and $C_{7-20}$-aralkyl. More preferred derivatives of HO—C(=O)-$L^1$-C(=O)—$R^1$ (1i) are the corresponding esters of formula $R^3O$—C(═O)-$L^1$-C(═O)—$R^1$ (1i'), wherein $R^3$ is selected from the group consisting of $C_{1-6}$-alkyl and $C_{5-8}$-cycloalkyl.

The linking group $L^1$ can be any linking group.

Preferred polyester polyols (1) carry at least one keto-type C═O group derived from HO—C(═O)-$L^1$-C(═O)—$R^1$ (1i) or from a derivative thereof, wherein $L^1$ is a linking group and $R^1$ is $C_{1-10}$-alkyl.

More preferred polyester polyols (1) carry at least one keto-type C═O group derived from HO—C(═O)-$L^1$-C(═O)—$R^1$ (1i) or from a derivative thereof, wherein $L^1$ is a $C_{1-10}$-alkylene group and $R^1$ is $C_{1-6}$-alkyl.

Even more preferred polyester polyols (1) carry at least one keto-type C═O group derived from HO—C(═O)-$L^1$-C(═O)—$R^1$ (1i) or from a derivative thereof, wherein $L^1$ is a $C_{1-6}$-alkylene group and $R^1$ is $C_{1-4}$-alkyl.

Most preferred polyester polyols (1) carry at least one keto-type C═O group derived from HO—C(═O)-$L^1$-C(═O)—$R^1$ (1i) or from a derivative thereof, wherein $L^1$ is a $CH_2CH_2$ group and $R^1$ is $CH_3$.

HO—C(═O)-$L^1$-C(═O)—$R^1$ (1i), wherein $L^1$ is a $CH_2CH_2$ group and $R^1$ is $CH_3$, is also called levulinic acid.

Levulinic acid can be prepared from renewable materials such as hexoses, e.g. glucose or fructose, or from starch by methods known in the art.

$C_{1-10}$-alkylene and $C_{1-6}$-alkylene can be branched or unbrached. Examples of $C_{1-6}$-alkylene are methylene, ethylene, propylene, 1-methylethylene, butylene, 1,1-dimethylethylene, pentylene and hexylene. Examples of $C_{1-10}$-alkylene are methylene, ethylene, propylene, 1-methylethylene, butylene, 1,1-dimethylethylene, pentylene, hexylene, heptylene, octylene, nonylene and decylene.

Examples of $C_{5-8}$-cycloalkyl are cyclopentyl and cyclohexyl.

Examples of $C_{6-10}$-aryl are phenyl and naphthyl.

Examples of $C_{7-20}$-aralkyl are benzyl, (2-phenyl)ethyl and (3-phenyl)n-propyl.

$C_{1-4}$-alkyl, $C_{1-6}$-alkyl, $C_{1-10}$-alkyl and $C_{1-20}$-alkyl can be branched or unbrached. Examples of $C_{1-4}$-alkyl are methyl, ethyl, propyl, isopropyl, butyl, isobutyl, sec-butyl and tert-butyl. Examples of $C_{1-6}$-alkyl are methyl, ethyl, propyl, isopropyl, butyl, isobutyl, sec-butyl tert-butyl, pentyl, 2-pentyl, 3-pentyl, 2-methylbutyl, 3-methylbutyl, 2,2-dimethylpropyl, hexyl, 2-hexyl and 3-hexyl. Examples of $C_{1-10}$-alkyl are methyl, ethyl, propyl, isopropyl, butyl, isobutyl, sec-butyl, tert-butyl, pentyl, 2-pentyl, 3-pentyl, 2-methylbutyl, 3-methylbutyl, 2,2-dimethylpropyl, hexyl, 2-hexyl, 3-hexyl, heptyl, octyl, 2-ethylhexyl, nonyl and decyl. Examples of $C_{1-20}$-alkyl are methyl, ethyl, propyl, isopropyl, butyl, isobutyl, sec-butyl, tert-butyl, pentyl, 2-pentyl, 3-pentyl, 2-methylbutyl, 3-methylbutyl, 2,2-dimethylpropyl, hexyl, 2-hexyl, 3-hexyl heptyl, octyl, 2-ethylhexyl, nonyl, decyl, undecyl, dodecyl, tridecyl, tetradecyl, pentadecyl, hexadecyl, heptadecyl, octadecyl, nonadecyl and eicosyl.

The polyester polyol (1) has preferably a number average molecular weight Mn in the range of 500 to 10000 g/mol, more preferably of 1000 to 6000 g/mol, even more preferably from 1500 to 4000 g/mol, and most preferably from 1500 to 3500 g/mol. The number average molecular weight Mn is determined using gel permeation chromatography calibrated to a polystyrene standard.

The polyester polyol (1) has preferably a dispersity D determined by dividing the weight average molecular weight Mw by the number average molecular weight Mn, of 1-40, more preferably of 1-20, even more preferably of 1-15 and most preferably of 1-10. The weight average molecular weight Mw and the number average molecular weight are determined using gel permeation chromatography calibrated to a polystyrene standard.

Preferably, the polyester polyol (1) has an acid number below 10 mg KOH/g, more preferably below 5 mg KOH/g, even more preferably below 4.5 mg KOH/g, most preferably in the range of 1.5 to 4 mg KOH/g. The acid number is determined according to DIN53402, 1990.

Preferably, the polyester polyol (1) has a hyroxyl number of 20-300 mg KOH/g, more preferably of 30-250 mg KOH/g, even more preferably of 40-200 mg KOH/g, most preferably of 50-150 mg KOH/g. Especially preferred are polyester polyols (1) with a hydroxyl number of 60-100 mg KOH/g. The hydroxyl number is determined according to DIN53240, 2016.

Preferably, the polyester polyol (1) has an average OH-functionality of 2 to 10, more preferably from 2.2 to 8, even more preferably from 2.4 to 6, and most preferably from 2.5 to 4.5. OH-functionality refers to the number of OH-groups carried by one polyester polyol molecule.

Preferably, the polyester polyol (1) has a keto-type C═O group-density in the range of 0.01 to 4 mmol keto-type C═O groups/g polyester polyol, more preferably in the range of 0.05 to 4 mmol keto-type C═O groups/g polyester polyol, even more preferably in the range of 0.1 to 3 mmol keto-type C═O groups/g polyester polyol, and most preferably in the range of 0.15 to 2.5 mmol keto-type C═O groups/g polyester polyol.

The keto-type C═O group density of the polyester polyol (1) can be calculated based on the monomers used to prepare the polyester polyol (1).

Preferably, the polyester polyol (1) comprises units derived from

- HO—C(═O)-$L^1$-C(═O)—$R^1$ (1i) or from a derivative thereof, wherein $L^1$ is a linking group, and $R^1$ is selected from the group consisting of $C_{1-20}$-alkyl, $C_{5-8}$-cycloalkyl, $C_{6-10}$-aryl and $C_{7-20}$-aralkyl, at least one diacid (1ii) or derivative thereof,
- optionally at least one polyacid (1iii) carrying at least three COOH groups or derivative thereof,
- at least one diol (1iv),
- at least one polyol (1v) carrying at least three OH groups, and
- optionally at least one compound (1vi) comprising at least one epoxy group.

More preferably, the polyester polyol (1) comprises units derived from

- 5 to 50 weight % of HO—C(═O)-$L^1$-C(═O)—$R^1$ (1i) or a derivative thereof, wherein $L^1$ is a linking group and $R^1$ is $C_{1-10}$-alkyl,
- 5 to 60 weight % of at least one diacid (1ii) or derivative thereof,
- 0 to 30 weight % of at least one polyacid (1iii) carrying at least three COOH groups or derivative thereof,
- 5 to 50 weight % of at least one diol (1iv),
- 5 to 50 weight % of at least one polyol (1v) carrying at least three OH groups (1v) and
- 0 to 20 weight % of at least one compound (1vi) comprising at least one epoxy group based on the weight of the sum of (1i), (1ii), (1iii), (1iv) (1v) and (1vi).

Even more preferably, the polyester polyol (1) comprises units derived from

- 15 to 40 weight % of HO—C(═O)-$L^1$-C(═O)—$R^1$ (1i) or a derivative thereof, wherein $L^1$ is $C_{1-10}$-alkylene and $R^1$ is $C_{1-6}$-alkyl (1i),
- 10 to 55 weight % of at least one diacid (1ii) or derivative thereof, 0 to 15 weight % of at least one polyacid (1iii) carrying at least three COOH groups or derivative thereof, 5 to 35 weight % of at least one diol (1iv), 10 to 40 weight % of at least one polyol (1v) carrying at least three OH groups and 0 to 10 weight % of at least one compound (1vi) carrying at least one epoxy group based on the weight of the sum of (1i), (1ii), (1iii), (1iv) (1v) and (1vi).

Most preferably, the polyester polyol (1) consists of units derived from 15 to 30 weight % of HO—C(═O)-$L^1$-C(═O)—$R^1$ (1i) or a derivative thereof, wherein $L^1$ is a $C_{1-6}$-alkylene and $R^1$ is $C_{1-4}$-alkyl, 10 to 50 weight % of at least one diacid (1ii) or derivative thereof, 0 to 10 weight % of at least one polyacid (1iii) carrying at least three COOH groups or derivative thereof, 5 to 30 weight % of at least one diol (1iv), 10 to 40 weight % of at least one polyol (1v) carrying at least three OH groups and 0 to 6 weight % of at least compound (1vi) carrying at least one epoxy group, based on the weight of the sum of (1i), (1ii), (1iii), (1iv) (1v) and (1vi).

In particular, the polyester polyol (1) consists of units derived from 15 to 30 weight % of HO—C(═O)-$L^1$-C(═O)—$R^1$ (1i) or a derivative thereof, wherein $L^1$ is a $CH_2CH_2$ and $R^1$ is $CH_3$, 10 to 50 weight % of at least one diacid (1ii) or derivative thereof, 0 to 10 weight % of at least one polyacid (1iii) carrying at least three COOH groups or derivative thereof, 5 to 30 weight % of at least one diol (1iv), 10 to 40 weight % of at least one polyol (1v) carrying at least three OH groups and 0 to 6 weight % of at least compound (1vi) carrying at least one epoxy group based on the weight of the sum of (1i), (1ii), (1iii), (1iv) (1v) and (1vi).

The molar ratio of the sum of OH groups of (1iv) and (1v) to the sum of COOH groups of (1i) or derived from a derivative thereof, of (1ii) or derived from a derivative thereof and of (1iii) or derived from a derivative thereof is in the range of 0.8/1 to 1.6/1, preferably in the range of 0.9/1 to 1.4/1, more preferably in the range of 1/1 to 1.3/1.

Aromatic diacids carry two COOH groups, wherein at least one COOH group is directly attached to an aromatic ring. Alicyclic diacids carry two COOH groups and comprise at least one alicyclic ring and wherein each COOH group is not directly attached to an aromatic ring. Aliphatic diacids carry two COOH groups and comprise no alicyclic ring, and each COOH group is not directly attached to an aromatic ring. Preferred aliphatic, alicyclic and aromatic diacids, exclusively consist, apart from the two COOH groups, of carbons and hydrogens.

Derivatives of the diacid (1ii) can be the corresponding anhydride in monomeric or polymeric form, the corresponding mono- or di-$C_{1-4}$-alkyl-esters such as monomethyl ester, dimethyl ester, monoethylester, diethyl ester or mixed methyl ethyl esters, the corresponding amides, or the corresponding acid halides such as chlorides or bromides.

Examples of aliphatic diacids are oxalic acid, malonic acid, succinic acid, glutaric acid, adipic acid, pimelinic acid, suberic acid, azelaic acid, sebacic acid, 1,11-undecanedicarboxylic acid, 1,12-dodecanedicarboxlyic acid, maleic acid, fumaric acid, 2-methylmalonic acid, 2-ethylmalonic acid, 2-methylsuccinic acid, 2-ethylsuccinic acid, itaconic acid, 3,3-dimethylglutaric, 2-phenyl-malonic acid and 2-phenylsuccinic acid.

Examples of alicyclic diacids are cyclopentane-1,2-dicarboxylic acid, cyclopentane-1,3-dicarboxylic acid, cyclohexane-1,2-dicarboxylic acid, cyclohexane-1,3-dicarboxylic acid, cyclohexane-1,4-dicarboxylic acid, cycloheptane-1,2-dicarboxylic acid, 1,2-bis(carboxymethyl)-cyclohexane, 1,3-bis(carboxymethyl)-cyclohexane and 1,4-bis(carboxymethyl)-cyclohexane.

Examples of aromatic diacids are phthalic acid, isophthalic acid, terephthalic acid and bis(4-carboxyphenyl) methane.

Preferably, the diacid (1ii) is an aliphatic or alicyclic diacid. More preferably, the diacid (1ii) is and aliphatic diacid. Even more preferably, the diacid (1ii) is an aliphatic diacid selected from the group consisting of malonic acid, succinic acid, glutaric acid, adipic acid, pimelinic acid, suberic acid and azelaic acid. Most preferably, the diacid (1ii) is adipic acid.

The polyacid (1iii) carrying at least three COOH groups can be an aliphatic, alicyclic or aromatic polyacid carrying at least three COOH groups.

Examples of alicyclic polyacids carrying three COOH groups are 1,3,5-cyclohexanetricarboxylic acid and aconitic acid. Examples of aromatic polyacid carrying three COOH groups are 1,2,4-benzenetricarbocxylic acid and 1,3,5-benzenetricarbocxylic acid. An example of an aromatic polyacid carrying four COOH groups is 1,2,4,5-benzenetetracarboxylic acid. An example of an aromatic polyacid carrying six COOH groups is mellitic acid.

Derivatives of the polyacid carrying at least 3 COOH groups (1iii) can be the corresponding anhydride in monomeric or polymeric form, the corresponding mono- or di-$C_{1-4}$-alkyl-esters such as monomethyl ester, dimethyl ester, monoethylester, diethyl ester or mixed methyl ethyl esters, the corresponding amides, or the corresponding acid halides such as chlorides or bromides.

An example of a derivative of a polyacid carrying at least three COOH groups (1iii) is pyromellitic dianhydride.

The diol (1iv) can be an aliphatic, alicyclic or aromatic diol.

Aromatic diols carry two OH groups, wherein at least one OH group is directly attached to an aromatic ring. Alicyclic diols carry two OH groups and comprise at least one alicyclic ring and wherein each OH group is not directly attached to an aromatic ring. Aliphatic diols carry two OH groups and comprise no alicyclic ring, and each OH group is not directly attached to an aromatic ring. Preferred aliphatic, alicyclic and aromatic diols, exclusively consist, apart from the two OH groups, of carbons and hydrogens. Preferred aliphatic and alicyclic diols, exclusively consist, apart from the two OH groups, of carbons and hydrogens, and do not comprise an aromatic ring.

Examples of aliphatic diols are ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, heptane-1,7-diol, octane-1,8-diol, octane-1,2-diol, nonane-1,9-diol, decane-1,2-diol, decane-1,10-diol, dodecane-1,2-diol, dodecane-1,12-diol, hexa-1,5-diene-3,4-diol, neopentyl glycol, 2-methyl-pentane-2,4-diol, 2,4-dimethyl-pentane-2,4-diol, 2-ethyl-hexane-1,3-diol, 2,5-dimethyl-hexane-2,5-diol, 2,2,4-trimethyl-pentane-1,3-diol, pinacol and hydroxypivalinic acid neopentyl glycol ester.

Further examples of aliphatic diols are diethylene glycol, triethylene glycol, dipropylene glycol, tripropylene glycol, polyethylene glycols $HO(CH_2CH_2O)_n$—H, polypropylene glycols $HO(CH(CH_3)—CH_2—O)_n$—H, n being an integer and n>=4, and preferably <=20, polyethylene-polypropylene glycols, the sequence of the ethylene oxide or propylene oxide units being blockwise or random, polytetramethyleneglycols, polytetrahydrofurane and polycaprolactone.

Examples of alicyclic diols are 1,1-bis(hydroxymethyl)-cyclohexane, 1,2-bis(hydroxymethyl)-cyclohexane, 1,3-bis (hydroxymethyl)-cyclohexane, 1,4-bis(hydroxymethyl)-cyclohexane, 1,1-bis(hydroxyethyl)-cyclohexane, 1,2-bis (hydroxyethyl)-cyclohexane, 1,3-bis(hydroxyethyl)-cyclohexan, 1,4-bis(hydroxyethyl)-cyclohexane, 2,2,4,4-tetramethyl-1,3-cyclobutandiol, cyclopen-tane-1,2-diol, cyclopentane-1,3-diol, 1,2-bis(hydroxymethyl) cyclopentane, 1,3-bis(hydroxymethyl) cyclopentane, cyclohexane-1,2-diol, cyclohexane-1,3-diol, cyclohexane-1,4-diol, cycloheptane-1,3-diol and cycloheptane-1,4-diol and cycloheptane-1,2-diol.

An example of an aromatic diol is benzene-1,2-diol.

Preferably, the diol (1iv) is an aliphatic or alicyclic diol. More preferably, the diol (1iv) is an alicyclic diol. Even more preferably, the diol (1iv) is an alicyclic diol deselected from the group consisting of 1,1-bis(hydroxymethyl)-cyclohexane, 1,2-bis(hydroxymethyl)-cyclohexane, 1,3-bis-(hydroxymethyl)-cyclohexane, 1,4-bis(hydroxymethyl)-cyclohexane, 1,1-bis(hydroxyethyl)-cyclohexane, 1,2-bis (hydroxyethyl)-cyclohexane, 1,3-bis(hydroxyethyl)-cyclohexan and 1,4-bis(hydroxyethyl)-cyclohexane. Most preferably, the diol (1iv) is 1,4-bis(hydroxymethyl)-cyclohexane.

The polyol carrying at least three OH groups (1v) can be an aliphatic, alicyclic or aromatic polyol carrying at least three OH groups.

Aromatic polyols carrying at least three OH groups carry at least one OH group which is directly attached to an aromatic ring. Alicyclic polyols carrying at least three OH groups comprise at least one alicyclic ring and each OH group is not directly attached to an aromatic ring. Aliphatic polyols carrying at least three OH groups comprise no alicyclic ring, and each OH group is not directly attached to an aromatic ring. Preferred aliphatic and alicyclic polyols carrying at least three OH groups do not comprise aromatic rings. More preferred aliphatic and alicyclic polyols carrying at least three OH groups do not comprise aromatic rings and, exclusively consist, apart from the the OH groups, of carbons and hydrogens.

Examples of aliphatic polyols carrying at least three OH groups are glycerol, trimethylolmethane, 1,1,1-trimethylolethane, 1,1,1-trimethylolpropane, 1,2,4-butanetriol, pentaerythritol, 1,3,5-tris(2-hydroxyethyl)isocyanurate, diglycerol, triglycerole, condensates of at least four glycerols, di(trimethylolpropane) and di(pentaerythritol, and condensates of aliphatic compounds carrying at least three OH groups with ethylene oxide, propylene oxide and/or butylene oxide.

Examples of alicyclic polyols carrying at least three OH groups are inositol, sugars such as glucose, fructose and sucrose, sugar alcohols such as sorbitol, mannitol, threitol, erythritol, adonitol (ribitol), arabitol (lyxitol), xylitol, dulcitol (galactitol), malitol and isomalt, as well as tris(hydroxymethyl)amine, tris(hydroxyethyl)amine and tris(hydroxypropyl)amine.

Preferably, the polyol (1v) carrying at least three OH groups is an aliphatic or alicyclic polyol carrying at least three OH groups. More preferably, the polyol (1v) carrying at least three OH groups is an aliphatic polyol carrying at least three OH groups. Even more preferably, the polyol carrying at least three OH groups is an aliphatic polyol carrying at least three OH groups selected from the group consisting of trimethylolmethane, 1,1,1-trimethylolethane, 1,1,1-trimethylolpropane and 1,2,4-butanetriol. Most preferably, the polyol carrying at least three OH groups is 1,1,1-trimethylolpropane.

The compound (1vi) carrying at least one epoxy group can be a compound carrying one epoxy group or compounds carrying at least two epoxy groups.

Examples of compounds carrying one epoxy group are glycidyl ester of a $C_{6-20}$-alkanoic acid, preferably of a $C_{9-11}$-akanoic acids, wherein the alpha-carbon is a quaternary carbon atom, such neodecanoic acid, 2,3-epoxypropyl ester.

Examples of compounds carrying two epoxy group bisphenol A diglycidyl ether, bisphenol F diglycidyl ether, 1,4-butandiol diglycidylether and pentaerythritol tetraglycidylether.

The compound (1vi) carrying at least one epoxy group is preferably, a compound carrying one epoxy group, more preferably the glycidyl ester a $C_{9-11}$-akanoic acids, wherein the alpha-carbon is a quaternary carbon atom.

Also part of the present invention is a process for preparing a polyester polyol (1) carrying at least one keto-type C═O group derived from HO—C(═O)-$L^1$-C(═O)—$R^1$ (1i) or from a derivative thereof, wherein $L^1$ is a linking group and $R^1$ is selected from the group consisting of $C_{1-20}$-alkyl, $C_{5-8}$-cycloalkyl, $C_{6-10}$-aryl and $C_{7-20}$-aralkyl, which process comprises the steps of (i) esterifying a polyester polyol comprising units derived from
 at least one diacid (1ii) or derivative thereof,
 optionally a polyacid (1iii) carrying at least three COOH groups or derivative thereof,
 at least one diol (1iv), and
 at least one polyol (1v) carrying at least three OH groups,
 with HO—C(═O)-$L^1$-C(═O)—$R^1$ (1i) or a derivative thereof, wherein $L^1$ is a linking group and $R^1$ is selected from the group consisting of $C_{1-10}$-alkyl, $C_{5-8}$-cycloalkyl, $C_{6-10}$-aryl and $C_{7-12}$-aralkyl,
 optionally in the presence of a catalyst and
 optionally in the presence of an organic solvent,
 and
(ii) optionally treating the product of the first step with at least compound (1vi) carrying at least one epoxy group to form the polyester polyols (1) carrying at least one keto-type C═O group derived from HO—C(═O)-$L^1$-C(═O)—$R^1$ (1i) or from a derivative thereof, wherein $L^1$ is a linking group and $R^1$ is selected from the group consisting of $C_{1-20}$-alkyl, $C_{5-8}$-cycloalkyl, $C_{6-10}$-aryl and $C_{7-20}$-aralkyl.

Preferably the esterification reaction is performed in the presence of a catalyst. The catalyst can be selected from the group consisting of acidic inorganic catalysts, acidic organic catalysts, organometallic catalysts and mixtures thereof.

Examples of acidic inorganic catalysts are sulfuric acid, sulfates and hydrogen sulfates such as sodium hydrogen sulfate, phosphoric acid, phosphonic acid, hypophosphoric acid aluminium sulfate hydrate, alum, acidic silica gel (pH<=6, especially pH<=5) and acidic aluminium oxide.

Examples of acidic organic catalysts are organic compounds containing phosphate groups, sulfonic acid groups, sulfate groups or phosphonic acid groups, such as para-toluene sulfonic acid and methane sulfonic acid. Further examples of acidic organic catalysts are acidic ion exchangers such as polystyrene resins being crosslinked with divinylbenzene and containing sulfonic acid groups.

Examples of organometallic catalysts are organic aluminium catalysts such as tris(n-butyloxy)aluminium, tris(isopropyloxy)aluminium and tris(2-ethylhexoxy)aluminium, as well as organic titanium catalysts such as titanium(IV) butoxide, tetra(isopropyloxy)titanium (IV) and tetra(2-ethylhexoxy)titanium(IV), organic tin catalysts such as dibutyltin oxide, diphenyltin oxide, dibutyltin dichloride, tin(II)di(n-octanoate), tin(II) di(2-ethylhexanoate), tin(II) laurate, dibutyltin diacetate, dibutyltin dilaurate, dibutyltin dimaleate and dioctyltin diacetate as well as organic zinc catalysts such as zinc acetate.

Preferably, the catalyst is an organometallic catalyst, more preferably an organic titanium catalyst, most preferably titanium (IV) butoxide.

Examples of suitable solvents include hydrocarbons such as n-heptane, cyclohexene, toluene, ortho-xylene, meta-xylene, para-xylene, xylene isomer mixture, ethylbenzene, chlorobenzene, ortho- and meta-dichlorobenzene. Of further suitability as solvents in the absence of acidic catalysts are ethers such as dioxane or tetrahydrofuran, and ketones such as methyl ethyl ketone and methyl isobutyl ketone. Preferably, the amount of solvent, if present at all, is below 5 weight % based on the weight of the reaction mixture of the esterification step.

Water formed in the course of the esterification step can be removed continuously during the reaction, for example by distillation. Water can also be removed by stripping or by performing the reaction in the presence of a water-removing agent such as $MgSO_4$ and $Na_2SO_4$. Preferably, water is removed by distillation, optionally in combination with other water-removal methods. If other volatile components, for example methanol or ethanol, are formed in the course of the reaction, these can also be removed, for example by distillation or stripping.

Preferably, the esterification reaction is carried out under a gas, which is inert under the reaction conditions. Suitable inert gases include nitrogen and argon.

The esterification reaction can be performed at a pressure in the range of 10 mbar to 10 000 mbar, preferably at a pressure in the range of 10 to 2000 mbar, more preferably at a pressure in the range of 10 to 1200 mbar, most preferably at a pressure in the range of 100 to 1100 mbar.

The temperature used in the esterification step is usually in the range of 60 to 250° C., preferably, in the range of 100 to 240° C. and more preferably in the range of 120 to 220° C.

The esterification reaction can be monitored by determining the hydroxyl number or acid number of the product of the esterifying step.

When the target hydroxyl of the product of the esterification step is reached, the compound (1vi) carrying at least one epoxy group is can be added. The reaction of the second step can proceed at a temperature of 150 to 250° C.

The polyester polyol (1) obtained can be worked-up by methods known in the art or used as "crude" product.

Also part of the present invention is an aqueous polyurethane dispersion (PUD) comprising at least one polyurethane (2) carrying at least one keto-type C═O group, water, and optionally at least one organic solvent (4), wherein the at least one polyurethane (2) carrying at least one keto-type C═O group comprises units derived from at least one polyester polyol (1) of the present invention.

The aqueous polyurethane dispersion (PUD) of the present invention preferably comprises 5 to 90 weight % of at least one polyurethane (2) carrying at least one keto-type C═O group, 20 to 95 weight % of water, and 0 to 5 weight % of organic solvent (4), based on the weight of (2), water and organic solvent (4), wherein the at least one polyurethane (2) carrying at least one keto-type C═O group comprises units derived from at least one polyester polyol (1) of the present invention.

More preferably, the aqueous polyurethane dispersion (PUD) of the present invention comprises 10 to 70 weight % of at least one polyurethane (2) carrying at least one keto-type C═O group, 30 to 90 weight % of water, and 0 to 3 weight % of organic solvent (4), based on the weight of (2), water and organic solvent (4), wherein the at least one polyurethane (2) carrying at least one keto-type C═O group comprises units derived from at least one polyester polyol (1) of the present invention.

Even more preferably, the aqueous polyurethane dispersion (PUD) of the present invention comprises 20 to 60 weight % of at least one polyurethane (2) carrying at least one keto-type C═O group, 40 to 80 weight % of water, and 0 to 2 weight % of organic solvent (4), based on the weight of (2), water and organic solvent (4), wherein the at least one polyurethane (2) carrying at least one keto-type C═O group comprises units derived from at least one polyester polyol (1) of the present invention.

Most preferably, the aqueous polyurethane dispersion (PUD) of the present invention consists of 20 to 60 weight % of at least one polyurethane (2) carrying at least one keto-type C═O group, 40 to 80 weight % of water, 0 to 1 weight % of organic solvent based on the weight of (2), water and organic solvent (4), wherein the at least one polyurethane (2) carrying at least one keto-type C═O group comprises units derived from at least one polyester polyol (1) of the present invention.

Also, part of the present invention is an aqueous self-crosslinkable polyurethane dispersion (SC-PUD) comprising at least one polyurethane (2) carrying at least one keto-type C═O group, at least one compound (3) carrying at least two keto-type C═O group reactive groups and optionally at least one organic solvent (4), wherein the at least one polyurethane (2) carrying at least one keto-type C═O group comprises units derived from at least one polyester polyol (1) of the present invention.

The aqueous self-crosslinkable polyurethane dispersion (SC-PUD) of the present invention preferably comprises 5 to 90 weight % of at least one polyurethane (2) carrying at least one keto-type C═O group, 0.01 to 20 weight % of at least one compound (3) carrying at least two keto-type C═O group reactive groups, and 20 to 95 weight % of water, and 0 to 5 weight % of organic solvent (4), based on the weight of (2) (3), water and organic solvent (4), wherein the at least one polyurethane (2) carrying at least one keto-type C═O group comprises units derived from at least one polyester polyol (1) of the present invention.

More preferably, the aqueous self-crosslinkable polyurethane dispersion (SC-PUD) of the present invention comprises 10 to 70 weight % of at least one polyurethane (2) carrying at least one keto-type C═O group,
0.1 to 5 weight % of at least one compound (3) carrying at least two keto-type C═O group reactive groups, and
30 to 90 weight % of water, and
0 to 3 weight % of organic solvent (4),
based on the weight of (2) (3), water and organic solvent (4),
wherein the at least one polyurethane (2) carrying at least one keto-type C═O group comprises units derived from at least one polyester polyol (1) of the present invention.

Even more preferably, the aqueous self-crosslinkable polyurethane dispersion (SC-PUD) of the present invention comprises 20 to 60 weight % of at least one polyurethane (2) carrying at least one keto-type C═O group,
0.1 to 3 weight % of at least one compound (3) carrying at least two keto-type C═O group reactive groups, and
40 to 80 weight % of water, and
0 to 2 weight % of organic solvent (4),
based on the weight of (2) (3), water and organic solvent (4),
wherein the at least one polyurethane (2) carrying at least one keto-type C═O group comprises units derived from at least one polyester polyol (1) of the present invention.

Most preferably, the aqueous self-crosslinkable polyurethane dispersion (SC-PUD) of the present invention consists of 20 to 60 weight % of at least one polyurethane (2) carrying at least one keto-type C═O group,
0.1 to 1 weight % of at least one compound (3) carrying at least two keto-type C═O group reactive groups, and
40 to 80 weight % of water,
0 to 2 weight % of organic solvent
based on the weight of (2) (3), water and organic solvent (4),
wherein the at least one polyurethane (2) carrying at least one keto-type C═O group comprises units derived from at least one polyester polyol (1) of the present invention.

Preferably, at least 60%, more preferably at least 80%, even more preferably at least 90%, most preferably at least 95%, of the keto-type C═O groups of the polyurethane (2) derive from the keto-type C═O groups of the at least one polyester polyol (1) of the present invention.

The solid content of the aqueous self-crosslinkable polyurethane dispersion (SC-PUD) comprising the polyurethane (2) is usually in the range of 10 to 80 weight %, preferably 20 to 60 weight %, more preferably 25 to 50 weight %. The solid content is determined using DIN ISO 3251,2019

The aqueous self-crosslinkable polyurethane dispersion (SC-PUD) comprising the polyurethane (2) has usually a viscosity at 23° C. in the range of 10 to 1000 mPas, preferably in the range of 30 to 500 mPas, most preferably in the range of 50 to 300 mPas. The viscosity is determined using DIN ISO 2555,2018.

The aqueous self-crosslinkable polyurethane (SC-PUD) dispersion comprising the polyurethane (2) has usually a pH in the range of 7 to 9. The pH is determined using DIN ISO 976, 2016.

The aqueous self-crosslinkable polyurethane dispersion (SC-PUD) comprising the polyurethane (2) has usually a minimum film forming temperature in the range of 1 to 50° C., preferably in the range of 5 to 25° C. The minimum film forming temperature is determined using DIN ISO 2115, 2001.

The particles of the aqueous self-crosslinkable polyurethane dispersion (SC-PUD) comprising the polyurethane (2) have usually an average particle size of 10 nm to 5000, preferably from 10 nm to 1000 nm, more preferably from 20 nm to 500 nm, most preferably from 20 to 200 nm. The average particle size is determined using dynamic light scattering (DLS) ISO 22412, 2017.

The polyurethane (2) carrying at least one keto-type C═O group can be any polymer comprising urethane units, and comprising units derived from at least one polyester polyol (1) of the present invention.

Preferably, polyurethane (2) carrying at least one keto-type C═O group comprises units derived from at least one polyester polyol (1) of the present invention,
at least one polymeric polyol (2i) different from polyester polyol (1),
at least one polyol (2ii) having a molecular weight of below 400 g/mol,
at least one polyol (2iii) carrying at least one acidic group or a salt thereof,
optionally at least one alcohol or polyol (2iv) carrying at least one olefinically unsaturated group
at least one polyisocyanate (2v),
at least one polyamine (2vi) carrying at least two amino groups independently selected from the group consisting of primary and secondary amino groups, and
optionally at least one compound carrying at least one olefinically unsaturated group and no
NCO reactive groups (2vii)

More preferably, the polyurethane (2) carrying at least one keto-type C═O group comprises units derived from 1 to 40 weight % of at least one polyester polyol (1) of the present invention,
5 to 70 weight % of at least one polymeric polyol (2i) different from polyester polyol (1),
1 to 30 weight % of at least one polyol (2ii) having a molecular weight of below 400 g/mol,
0.5 to 20 weight % of at least one polyol (2iii) carrying at least one acidic group or a salt thereof,
0 to 30 weight % of at least one alcohol or polyol (2iv) carrying at least one olefinically unsaturated group
10 to 80 weight % of at least one polyisocyanate (2v),
0.1 to 10 weight % of at least one polyamine (2vi) carrying at least two amino groups independently selected from the group consisting of primary and secondary amino groups, and
0 to 20 weight % of at least one compound (2vii) carrying at least one olefinically unsaturated group and no NCO reactive groups,
based on the weight of the sum of (1), (2i) (2ii), (2iii), (2iv), (2v), (2vi) and (2vii).

Even more preferably, the polyurethane (2) carrying at least one keto-type C═O group comprises units derived from 1 to 20 weight % of at least one polyester polyol (1) of the present invention, 5 to 60 weight % of at least one polymeric polyol (2i) different from polyester polyol (1), 1 to 20 weight % of at least one polyol (2ii) having a molecular weight of below 400 g/mol, 0.5 to 15 weight % of at least one polyol (2iii) carrying at least one acidic group or a salt thereof, 0 weight % of at least one alcohol or polyol (2iv) carrying at least one ethylenically unsaturated group, 20 to 60 weight % of at least one polyisocyanate (2v), 0.1 to 6 weight % of at least one polyamine (2vi) carrying at least two amino groups independently selected from the group consisting of primary and secondary amino groups, and 0 to 5 weight % of at least one compound carrying at least one olefinically unsaturated group and no NCO reactive groups (2vii)

based on the weight of the sum of (1), (2i) (2ii), (2iii), (2iv), (2v), (2vi) and (2vii).

Most preferably, the polyurethane (2) carrying at least one keto-type C═O group consists of units derived from 5 to 15 weight % of at least one polyester polyol (1) of the present invention, 10 to 50 weight % of at least one polymeric polyol (2i) different from polyester polyol (1), 1 to 15 weight % of at least one polyol (2ii) having a molecular weight of below 400 g/mol, 1 to 10 weight % of at least one polyol (2iii) carrying at least one acidic group or a salt thereof, 25 to 50 weight % of at least one polyisocyanate (2v), and 0.1 to 6 weight % of at least one polyamine (2vi) carrying at least two amino groups independently selected from the group consisting of primary and secondary amino groups, based on the weight of the sum of (1), (2i) (2ii), (2iii), (2v) and (2vi).

The molar ratio of the NCO groups of (2v) to the sum of OH groups of (1), (2i), (2ii) (2iii) and (2iv) is preferably in the range of 0.9/1 to 1.6/1, more preferably in the range of from 1/1 to 1.4/1, most preferably in the range of 1.1/1 to 1.3/1.

The molar ratio of the NCO groups of (2v) to the sum of amino groups independently selected from the group consisting of primary and secondary amino groups of (2vi) is preferably in the range of 2/1 to 20/1, more preferably in the range of from 4/1 to 16/1, most preferably in the range of 7/1 to 14/1.

The molar ratio of the NCO groups of (2v) to the sum of OH groups of (1), (2i), (2ii) (2iii) and (2iv) and amino groups independently selected from the group consisting of primary and secondary amino groups of (2vi) is preferably in the range of 0.8/1 to 1.3/1, more preferably in the range of from 0.9/1 to 1.2/1, most preferably in the range of 1/1 to 1.1/1.

If at least one compound carrying at least one olefinically unsaturated group and no NCO reactive group (2vii) is present, the weight ratio of the sum of (1), (2i) (2ii), (2iii), (2iv), (2v) and (2vi) to (2vii) is preferably in the range of from 50/50 to 10/90.

The polymeric polyol (2i) different from polyester polyol (1) can be any polymeric polyol.

Examples of polymeric polyols (2i) are polyester polyols, polyether polyols, polycarbonate polyol, poly(meth)acrylate polyols, polyurethane polyols, a poly(urea-formaldehyde) polyols, poly(melamine-formaldehyde) polyols, natural oil polyols, polybutadiene polyols, polysulfide polyols.

Preferably, the polymeric polyol (2i) is selected from the group consisting of a polyester polyol polyether polyol and polycarbonate polyol. More preferably, the polymeric polyol (2i) is a polyester polyol. Most preferably, the polymeric polyol (2i) is a polyester polyol comprising units derived from an aliphatic diacid or a derivative thereof, an aromatic diacid or a derivative thereof and an aliphatic diol. Aliphatic diacids and derivatives thereof, aromatic diacids and derivatives thereof and aliphatic diols are as defined above.

Preferably, the polymeric polyol (2i) has an number average molecular weight of from 500 to 10000 g/mol, more preferably of from 600 to 8000 g/mol, even more preferably of from 800 to 5000 g/mol, and most preferably of from 1000 to 3000 g/mol. The number average molecular weight is determined by gel permeation chromatography using polystyrene standards.

Preferably, the polymeric polyol (2i) has an average OH-functionality of 1.5 to 8, more preferably from 1.6 to 6, even more preferably from 1.7 to 4, and most preferably from 1.8 to 2.5.

Preferably, the polymeric polyol (2i) has an OH-number of from 10 to 200 mg KOH/g, more preferably of from 20 to 100 mg KOH/g. The OH number is determined using DIN53240, 2016.

The polyol (2ii) having a molecular weight of below 400 g/mol can be a diol having a molecular weight of below 400 g/mol or a polyol carrying at least 3 OH groups and having a molecular weight of below 400 g/mol.

The diol having a molecular weight of below 400 g/mol can be an aliphatic, alicyclic or aromatic diol having a molecular weight of below 400 g/mol.

Aliphatic, alicyclic or aromatic diols are defined above.

Examples of aliphatic diols having a molecular weight of below 400 g/mol are ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, heptane-1,7-diol, octane-1,8-diol, octane-1,2-diol, nonane-1,9-diol, decane-1,2-diol, decane-1,10-diol, dodecane-1,2-diol, dodecane-1,12-diol, hexa-1,5-diene-3,4-diol, neopentyl glycol, 2-methyl-pentane-2,4-diol, 2,4-dimethyl-pentane-2,4-diol, 2-ethyl-hexane-1,3-diol, 2,5-dimethyl-hexane-2,5-diol, 2,2,4-trimethyl-pentane-1,3-diol, pinacol and hydroxypivalinic acid neopentyl glycol ester.

Further examples of aliphatic diols having a molecular weight of below 400 g/mol are diethylene glycol, triethylene glycol, dipropylene glycol, tripropylene glycol, polyethylene glycols, polypropylene glycols, polyethylene-polypropylene glycols, the sequence of the ethylene oxide or propylene oxide units being blockwise or random, polytetramethyleneglycols, polytetrahydrofurane and polycaprolactone, all having a molecular weight of below 400 g/mol.

Examples of alicyclic diols having a molecular weight of below 400 g/mol are 1,1-bis(hydroxymethyl)-cyclohexane, 1,2-bis(hydroxymethyl)-cyclohexane, 1,3-bis(hydroxymethyl)-cyclohexane, 1,4-bis(hydroxymethyl)-cyclohexane, 1,1-bis(hydroxyethyl)-cyclohexane, 1,2-bis(hydroxyethyl)-cyclohexane, 1,3-bis(hydroxyethyl)-cyclohexan, 1,4-bis(hydroxyethyl)-cyclohexane, 2,2,4,4-tetramethyl-1,3-cyclobutandiol, cyclopentane-1,2-diol, cyclopentane-1,3-diol, 1,2-bis(hydroxymethyl) cyclopentane, 1,3-bis(hydroxymethyl) cyclopentane, cyclohexane-1,2-diol, cyclohexane-1,3-diol, cyclohexane-1,4-diol, cycloheptane-1,3-diol and cycloheptane-1,4-diol and cycloheptane-1,2-diol.

An example of an aromatic diol is benzene-1,2-diol.

The polyol carrying at least 3 OH groups and having a molecular weight of below 400 g/mol can be an aliphatic, alicyclic or aromatic polyol carrying at least 3 OH groups and having a molecular weight of below 400 g/mol.

Aliphatic, alicyclic or aromatic polyol carrying at least 3 OH groups are as defined above.

Examples of aliphatic polyols carrying at least three OH groups and having a molecular weight of below 400 g/mol are glycerol, trimethylolmethane, 1,1,1-trimethylolethane, 1,1,1-trimethylolpropane, 1,2,4-butanetriol, pentaerythritol, 1,3,5-tris(2-hydroxyethyl)isocyanurate, diglycerol, triglycerole, condensates of at least four glycerols, di(trimethylolpropane) and di(pentaerythritol, and condensates of aliphatic compounds carrying at least three OH groups with ethylene oxide, propylene oxide and/or butylene oxide.

Examples of alicyclic polyols carrying at least three OH groups and having a molecular weight of below 400 g/mol are inositol, sugars such as glucose, fructose and sucrose, sugar alcohols such as sorbitol, mannitol, threitol, erythritol, adonitol (ribitol), arabitol (lyxitol), xylitol, dulcitol (galactitol), malitol and isomalt, as well as tris(hydroxymethyl) amine, tris(hydroxyethyl)amine and tris(hydroxypropyl)amine.

Preferably, the polyol (2ii) is a diol having a molecular weight of below 400 g/mol. More preferably, the polyol (2ii) is an aliphatic diol having a molecular weight of below 400 g/mol. Even more preferably, the polyol (2ii) is an aliphatic diol having a molecular weight of below 400 g/mol selected from the group consisting of are ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, heptane-1,7-diol, octane-1,8-diol, octane-1,2-diol. Most preferably, the polyol (2ii) is butane-1,4-diol.

The polyol (2iii) carrying at least one acidic group or a salt thereof can be a diol carrying at least one acidic group or salt thereof or a polyol carrying at least three OH groups and at least one acidic group or salt thereof.

Examples of acidic groups are C(═O)OH, $S(=O)_2OH$ and $P(=O)(OH)_2$.

Salts thereof are any salts thereof formed by treatment of the at least one acidic group with a base. Preferably, the base is used in an amount that in the range of from 50 to 95%, more preferably of from 65 to 90% of all acidic groups are reacted to the salt thereof.

The base can be an inorganic base, ammonia or an amine carrying only one amino group. The base is preferably used in amounts that in the range of from 50 to 95%, more preferably in the range of from 60 to 90% if all acidic groups are converted to the salt thereof.

Examples of inorganic bases are alkali and alkaline earth metal hydroxide, alkali and alkaline earth metal carbonate as well as alkali and alkaline earth metal hydrogencarbonate. Preferred inorganic bases are alkali metal hydroxide such as sodium or potassium hydroxide, alkali metal carbonate such as sodium carbonate and potassium carbonate as well as alkali metal hydrogencarbonate such as sodium hydrogen carbonate and potassium hydrogen carbonate.

The amino group of the amine carrying only one amino group can be a primary, secondary or tertiary amino group.

Examples of amines carrying only one primary amino group are n-butylamine, n-hexylamine, 2-ethyl-1-hexylamine, ethanolamine, 3-methoxypropylamine, 2-(2-aminoethyoxy)ethanol, 2-amino-1-propanol, 3-amino-propanol, 2-amino-butan-1-ol, benzylamine,1-(3-aminopropyl) imidazole, tetrahydrofurfurylamine, cyclohexylamine Examples of amine carrying only one secondary amino group are dimethylamine, diethylamine, diisopropylamine, di-n-butylamine, diethanolamine, dipropanolamine, piperidine, pyrrolidine and morpholine.

Examples amines carrying only one tertiary amino group are triethanolamine, tripropanolamine, N-methyldiethanolamine, N-ethyldiethanolamine, dimethylethanolamine, diethylethanolamine, triethylamine, ethyldiisopriopylamine, tripropylamine, triisopropylamine and tri-n-butylamine.

Examples of diols carrying at least one acidic group or salt thereof are 2,2-bis(hydroxymethyl) $C_{2-10}$-alkanoic acids or salts thereof such as 2,2-bis(hydroxymethyl) acetic acid, 2,2-bis(hydroxy-methyl) propionic acid (dimethylolpropionic acid), 2,2-bis(hydroxymethyl) butanoic acid, 2,2-bis (hydroxymethyl) pentanoic acid or salts thereof.

The polyol (2ii) carrying at least one acidic group or a salt thereof is preferably a diol carrying at least one acidic group or salt thereof, more preferably, a 2,2-bis(hydroxymethyl) $C_{2-10}$-alkanoic acid or a salt thereof, even more preferably 2,2-bis(hydroxymethyl) propionic acid (dimethylolpropionic acid) or 2,2-bis(hydroxymethyl) butanoic acid or a salt thereof formed by treatment of the acidic group with an amine carrying only one amino group, and most preferably 2,2-bis(hydroxymethyl) propionic acid (dimethylolpropionic acid) or a salt thereof formed by treatment with an amine carrying only one teriary amino group.

The alcohol or polyol (2iv) carrying at least one olefinically unsaturated group can by any alcohol or polyol carrying at least one olefinically unsaturated group.

Alcohols carry only one OH group. Polyols carry at least two OH groups

The alcohol carrying at least one olefinically unsaturated group can be an alcohol carrying one olefinically unsaturated group or an alcohol carrying at least two olefinically unsaturated groups.

The alcohols carrying one ethylenically unsaturated group are the partial esterification products carrying one OH group of the diol (1iv) described above with (meth)acrylic acid. Examples of alcohols carrying at one ethylenically unsaturated group are hydroxy $C_{1-10}$-alkyl (meth)acrylates such as hydroxymethyl(meth)acrylate, 2-hydroxyethyl(meth)acrylate, 3-hydroxypropyl-(meth)acrylate and 4-hydroxybutyl (meth)acrylate.

Examples of alcohols carrying at least two ethylenically unsaturated group are the partial esterification products carrying one OH group of the polyol (1v) described above with (meth)acrylic acid. Examples of alcohols carrying at at least two ethylenically unsaturated group are pentaerythritol tri(meth)acrylate, ditrimethylolpropane tri(meth)acrylate and dipentaerythritol penta(meth)acrylate.

Examples of polyols carrying at least one ethylenically unsaturated group are the partial esterification products carrying at least two OH groups of the polyol carrying at least three OH groups (1v) mentioned above with (meth) acrylic acid. Examples of polyols carrying at least one ethylenically unsaturated group are the partial esterification products carrying at least two OH groups of an ethoxylated or polyethoxylated 1,1,1-trimethylolpropane with meth (acrylic acid), dipentaerythritol tri(meth)acrylate and dipentaerythritol tetra(meth)acrylate.

(Meth)acrylic acid include methacrylic and acrylic acid.

The alcohol or polyol (2iv) carrying at least one ethylenically unsaturated group is preferably an alcohol carrying at least one ethylenically unsaturated group, more preferably an alcohol carrying one ethylenically unsaturated group, even more preferably hydroxy $C_{1-10}$-alkyl (meth)acrylate, and most preferably 2-hydroxyethyl (meth)acrylate.

The polyisocyanate (2v) can be an aliphatic, alicyclic or aromatic polyisocyanate.

Preferably, the NCO functionality of the polyisocyanate is in the range of from 1.8 to 10, more preferably in the range of 1.9 to 4, most preferably in the range of 1.9 to 2.5.

Aromatic polyisocyanates are polyisocyanates, wherein at least one NCO group is directly attached to an aromatic ring. Alicyclic polyisocyanates comprise at least one alicyclic ring and each NCO group is not directly attached to an aromatic ring. Aliphatic polyisocyanates do not comprise an alicyclic ring and each NCO group is not directly attached to an aromatic ring. Preferred aliphatic and alicyclic polyisocyanates do not comprise aromatic rings.

The NCO groups of the polyiscyanate can be blocked or, preferably, unblocked.

The polyisocyanate (2v) can be a monomeric polyisocyanate or polymeric polyisocyanate.

Examples of monomeric aliphatic polyisocyanates carrying two NCO groups are tetramethylene 1,4-diisocyanate, pentamethylene 1,5-diisocyanate, hexamethylene 1,6-diisocyanate, octamethylene 1,8-diisocyanate, decamethylene 1,10-diisocyanate, dodecamethylene 1,12-diisocyanate, tetradecamethylene 1,14-diisocyanate, methyl 2,6-diisocyanatohexanoate, ethyl 2,6-diisocyanatohexanoate, trimethylhexane diisocyanate or tetramethylhexane diisocyanate, Examples of monomeric alicyclic polyisocyanates carrying two NCO groups 1,4-diisocyanato-cyclohexane, 1,3-diisocyanatocyclohexane, 1,2-diisocyanatocyclohexane, 4,4'-di(isocyanatocyclohexyl)methane, 2,4'-di(isocyanatocyclohexyl)methane, 1-isocyanato-3,3,5-trimethyl-5-(isocyanatomethyl)cyclohexane (isophorone diisocyanate), 1,3-bis(isocyanatomethyl)-cyclohexane, 1,4-bis (isocyanatomethyl)cyclohexane, 2,4-diisocyanato-1-methylcyclohexane, 2,6-diisocyanato-1-methylcyclohexane, and 3 (or 4),8 (or 9)-bis (isocyanatomethyl)tricyclo[5.2.1.0(2,6)]decane.

Examples of monomeric aromatic polyisocyanates carrying two NCO groups are 2,4-tolylene diisocyanate, 2,6-tolylene diisocyanate, m-xylylene diisocyanate, p-xylylene diisocyanate, 2,4'-diisocyanatodiphenylmethane, 4,4'-diisocyanatodiphenylmethane, 1,3-phenylene diisocyanate, 1,4-phenylene diisocyanate, 1-chloro-2,4-phenylene diisocyanate, 1,5-naphthylene diisocyanate, diphenylene 4,4'-diisocyanate, 4,4'-diisocyanato-3,3'-dimethylbiphenyl, 3-methyl-diphenylmethane 4,4'-diisocyanate, tetramethylxylylene diisocyanate, 1,4-diisocyanatobenzene and diphenyl ether 4,4'-diisocyanate.

Examples of monomeric aliphatic polyisocyanates carrying at least three NCO groups are 1,4,8-triisocyanatononane, 2'-isocyanatoethyl 2,6-diisocyanatohexanoate.

Examples of monomeric aromatic polyisocyanates carrying at least three NCIO groups are 2,4,6-triisocyanatotoluene, triphenylmethane triisocyanate and 2,4,4'-triisocyanatodiphenyl ether.

Monomeric polyisocyanates can be prepared by methods known in the art, for example by treating the corresponding amines with phosgene.

The polymeric polyisocyanate usually comprises at least one unit derived from monomeric polyisocyanate.

The polymeric polyisocyanate preferably comprises (i) at least one unit independently derived from the group consisting of monomeric aliphatic, alicylic and aromatic polyisocyanates, and (ii) at least one structural unit selected from the group consisting of uretdione, isocyanurate, biuret, urea, carbodiimide, uretonimine, urethane, allophanate, oxadiazinetrione and iminooxadiazinedione.

The NCO content of polymeric polyisocyanates is usually in the range of 5 to 40% (weight NCO groups based on the weight of the polymeric polyisocyanate).

The polyisocyanate (2v) is preferably an aliphatic or alicyclic polyisocyanate, more preferably an alicyclic polyisocyanate, even more preferably a monomeric alicyclic diisocyanate, and most preferably 1-isocyanato-3,3,5-trimethyl-5-(isocyanatomethyl)cyclohexane (isophorone diisocyanate).

The polyamine (2vi) carrying at least two amino groups independently selected from the group consisting of primary and secondary amino groups can carry further functional group such as OH groups and acidic groups or salts thereof. Examples of acidic groups and salts thereof are given above.

The polyamine (2vi) can be an aliphatic, alicyclic or aromatic polyamine carrying at least two amino groups independently selected from the group consisting of primary and secondary amino group.

Aromatic polyamines carrying at least two amino groups independently selected from the group consisting of primary and secondary amino groups are polyamines, wherein at least one primary or secondary amino group is directly attached to an aromatic ring. Alicyclic polyamines carrying at least two amino groups independently selected from the group consisting of primary and secondary amino groups comprise at least one alicyclic ring and each primary or secondary amino group is not directly attached to an aromatic ring. Aliphatic polyamines carrying at least two amino groups independently selected from the group consisting of primary and secondary amino groups do not comprise an alicyclic ring and each primary or secondary amino group is not directly attached to an aromatic ring. Preferred aliphatic and alicyclic polyamines carrying at least two amino groups independently selected from the group consisting primary and secondary amino groups do not comprise aromatic rings.

Examples of aliphatic polyamines carrying at least two amino groups independently selected from the group consisting of primary and secondary amino groups are ethylenediamine, propylenediamine, butylenediamine, neopentanediamine, hexamethylenediamine, 4,9-dioxado-decane-1,12-diamine, 4,7,10-trioxatridecane-1,13-diamine, 3-(methylamino)propylamine, diethylenetriamine, dipropylenetriamine, triethylenetetramine, piperazine, 2-(2-aminoethylamino)-ethanol, 2-(2-aminoethylamino)ethanol, 6-amino-4-azahexanecarboxylic acid (N-(2'-carboxy-ethyl) ethylenediamine) or salts thereof and 5-amino-3-azapentanesulfonic acid (N-(2'-sulfo-ethyl)ethylenediamine) or salts thereof.

Examples of alicyclic polyamines carrying at least two amino groups independently selected from the group consisting of primary and secondary amino groups are 4,4'-diaminodicyclohexylmethane and isophorone diamine.

The polyamine (2vi) carrying at least two amino groups independently selected from the group consisting of primary and secondary amino groups is preferably an aliphatic or alicyclic polyamine carrying at least two amino groups independently selected from the group consisting of primary and secondary amino groups, more preferably an aliphatic or alicyclic polyamine carrying at least two amino groups independently selected from the group consisting of primary and secondary amino groups, which do not carry further functional groups, and most preferably diethylenetriamine, isophorone diamine or mixtures thereof.

The compound (2vii) carrying at least one olefinically unsaturated group and no NCO reactive group can be a compound carrying one olefinically unsaturated group and no NCO reactive group or a compound carrying at least two olefinically unsaturated groups and no NCO reactive group Examples of compounds carrying one ethylenically unsaturated group and no NCO reactive group are (meth) acrylic-type monomers carrying only one ethylenically unsaturated group and no NCO reactive group and styrene-type monomers carrying only one ethylenically unsaturated group and no NCO reactive group.

Examples of (meth)acrylic-type monomers carrying only one ethylenically unsaturated group and no NCO reactive group are $C_{1-20}$-alkyl(meth)acrylate, $C_{5-12}$-cycloalkyl(meth) acrylate, $[C_{1-10}$-alkoxy$(C_{1-10}$-alkoxy$)_{0.5}]C_{1-10}$-alkyl(meth-acrylate), glycidyl(meth)acrylate, glycidylcrotonate, (meth) acrylic monomers carrying keto-type C═O groups, (meth) acrylamide, (meth)acrylic acid, crotonic acid, itaconic acid, maleic acid and fumaric acid.

(Meth)acrylate include methacrylate and acrylate. (Meth) acrylamide includes methacrylamide and acrylamide.

Examples of $C_{1-20}$-alkyl(meth)acrylate are methyl(meth) acrylate, ethyl(meth)acrylate, n-propyl(meth)acrylate, butyl (meth)acrylate, isobutyl(methacrylate), sec-butyl(meth) acrylate, tert-butyl(meth)acrylate, pentyl(meth)acrylate, isopentyl(meth)acrylate, 2-methylbutyl(meth)acrylate, amyl (meth)acrylate, hexyl(meth)acrylate, 2-ethylbutyl(meth) acrylate, heptyl(methacrylate, octyl (meth)acrylate, 2-ethylhexyl(meth)acrylate, 2-propylheptyl(meth)acrylate, nony (meth)acrylate), decyl(methacrylate), undecyl(meth) acrylate and dodecyl(meth)acrylate.

Examples of $[C_{1-10}$-alkoxy$(C_{1-10}$-alkoxy$)_{0.5}]C_{1-10}$-alkyl (methacrylate) are 2-methoxyethyl-(meth)acrylate,2-ethoxyethyl(meth)acrylate, 4-methoxybutyl(meth)acrylate, 2-(2'-methoxy-ethoxy)ethyl(meth)acrylate.

Examples of $C_{5-12}$-cycloalkyl(meth) acrylate are cyclopentyl(meth)acrylate and cyclohexyl(meth)acrylate.

Examples of (meth)acrylic monomers carrying keto-type C═O groups are diacetone(meth)acrylamide, 2-(meth)acryloyloxy)ethyl acetoacetate, 2-(meth)acryloyloxy)propyl acetoacetate and 2-(meth)acryloyloxy)butyl acetoacetate.

Examples of styrene-type monomers are styrene, alpha-methylstyrene, para-methylstyrene, alpha-butylstyrene, para-butylstyrene and 2-vinylnaphthalene.

Examples of compounds carrying at least two olefinically unsaturated group and no NCO reactive group are (meth) acrylic-type monomers carrying at least two ethylenically unsaturated group and no NCO reactive group, and styrene-type monomers carrying at least two ethylenically unsaturated group and no NCO reactive group.

Examples of (meth)acrylic-type monomers carrying at least two ethylenically unsaturated group and no NCO reactive group are allyl (meth)acrylate, methallyl (meth) acrylate, 1,2-ethyleneglycol di(meth)acrylate, 1,2-propyleneglycol di(meth)acrylate, 1,3-propyleneglycol di(meth) acrylate, 1,2-butanediol di(meth)acrylate, 1,3-butanediol-di (meth)acrylate, 1,4-butanediol di(meth)acrylate, neopentylglycol di(meth)acrylate, 1,6-hexanediol di(meth) acrylate, 1,9-nonanediol di(meth)acrylate, 1,10-decanediol di (methacrylate), diethyleneglycol di(meth)acrylate, triethylene glycol di(meth)acrylate, tetraethyleneglycol di(meth) acrylate, tri(methylol)propane tri(meth)acrylate, tri(methylol)ethane tri(meth)acrylate, pentaerythritol tetra(meth) acrylate, ditrimethylolpropane tetra(meth)acrylate and dipentaerythritol hexa(meth)-acrylate An example of a styrene-type monomer carrying at least two ethylenically unsaturated group and no NCO reactive group is divinylbenzene.

Examples of keto-type C═O group reactive groups of the at least one compound (3) carrying at least two keto-type C═O group reactive groups are —C(═O)—NH($R_2$)—$NH_2$ and —N($R_2$)—$NH_2$ groups, wherein $R^2$ is selected from the group consisting of hydrogen, $C_{1-20}$-alkyl, $C_{5-8}$-cycloalkyl, $C_{6-10}$-aryl and $C_{7-20}$-aralkyl.

Examples of compounds (3) carrying two keto-type C═O group reactive groups, which are —C(═O)—N($R^2$)—$NH_2$ groups, wherein $R^2$ is hydrogen, are $NH_2NH$—C(O)-$L^2$-C (O)—NH—$NH_2$, wherein $L^2$ is a direct bond or $C_{1-20}$ alkylene, such as oxalic acid dihydrazide, malonic acid dihydrazide, succinic acid dihydrazide, glutaric acid dihydrazide, adipic acid dihydrazide, pimelic acid dihydrazide, suberic acid dihydrazide, azelaic acid dihydrazide, sebacid acid dihydrazide, undecanedioic acid dihydrazide, dodecanedioic acid dihydrazide, tridecanedioic acid dihydrazide and hexadecanedioic acid dihydrazide.

Further examples of compounds carrying two keto-type C═O group reactive groups, which are —C(═O)—N ($R^2$)—$NH_2$, wherein $R^2$ is hydrogen, are 1,3 and 1,4-phthalic acid dihydrazide and 2,6-napthalene dicarboxylic acid dihydrazide Examples of compounds (3) carrying two keto-type C═O group reactive groups, which are —N($R^2$)—$NH_2$ groups, wherein $R^2$ is hydrogen, are $NH_2$—$NH_2$, 1,2-, 1,3- and 1,4-cyclohexyl-dihydrazine, 1,4-phenylenedihydrazine and 2,3-naphthalene dihydrazine.

The molecular weight of the at least one compound (3) carrying at least two keto-type C═O group reactive groups is preferably below 1000 g/mol, more preferably below 500 g/mol, most preferably in the range of 100 to 300 g/mol.

Preferably, the at least one compound (3) carrying at least two keto-type C═O group reactive groups is at least one compound carrying at least two keto-type C═O group reactive groups, wherein the at least two keto-type C═O group reactive groups are selected from the group consisting of —C(═O)—NH($R^2$)—$NH_2$ and —N($R^2$)—$NH_2$, wherein $R^2$ is selected from the group consisting of hydrogen, $C_{1-20}$-alkyl, $C_{5-8}$-cycloalkyl, $C_{6-10}$-aryl and $C_{7-20}$-aralkyl.

More preferably, the at least one compound (3) carrying at least two keto-type C═O group reactive groups is a compound carrying at least two keto-type C═O group reactive groups, which are —C(═O)—N($R^2$)—$NH_2$ groups, wherein $R^2$ is selected from the group consisting of hydrogen, $C_{1-20}$-alkyl, $C_{5-8}$-cycloalkyl, $C_{6-10}$-aryl and $C_{7-20}$-aralkyl.

Even more preferably, the at least one compound (3) carrying at least two keto-type C═O group reactive groups is a compound carrying two to four keto-type C═O group reactive groups, which are —C(═O)—N($R^2$)—$NH_2$ groups, wherein $R^2$ is selected from the group consisting of hydrogen, $C_{1-10}$-alkyl and $C_{5-8}$-cycloalkyl.

Most preferably, the at least one compound (3) carrying at least two keto-type group reactive groups is a compound carrying two keto-type C═O group reactive groups which are —C(═O)—N($R^2$)—$NH_2$ groups, wherein $R^2$ is hydrogen or $C_{1-10}$-alkyl.

In particular, the at least one compound (3) carrying at least two keto-type C═O group reactive groups is is $NH_2NH$—C(═O)-$L^2$-C(═O)—NH—$NH_2$, wherein $L^2$ is a direct bond or $C_{1-20}$ alkylene, preferably $C_{1-10}$-alkylene, more preferably $C_{2-6}$-alkylene.

$C_{1-20}$-alkylene can be branched or unbranched. Examples of $C_{1-20}$-alkylene are $C_{1-10}$-alkylene and undecylene, dodecylene, tridecylene and hexadecylende. Examples of $C_{1-10}$-alkylene are given above. Examples of $C_{2-6}$-alkylene are ethylene, propylene, buylene, pentylene and hexylene.

The organic solvent (4) can be an aliphatic ketone such as acetone, ethyl methylketone or isobutyl methyl ketone, an aliphatic amide such as N-methylpyrrolidone or N-ethylpyrrolidone, an ether such as tetrahydrofuran, dipropylene glycol dimethyl ether or dioxane, a hydrocarbon such as n-heptane, cyclohexane, toluene, ortho-xylene, meta-xylene, para-xylene, and xylene isomer mixture, an ester such as butyl acetate, an acid such as acetic acid or a nitrile such as acetonitrite, or a mixture thereof.

The organic solvent (4) is preferably an aliphatic ketone, more preferably acetone, ethylmethylketone or a mixture thereof.

Also part of the present invention is a process for the preparation of the aqueous polyurethane dispersion (PUD) of the present invention comprising at least one polyurethane (2) carrying at least one keto-type C═O group, optionally at least one organic solvent (4), wherein the polyurethane (2) carrying at least one keto-type C═O group comprises units derived from at least one polyester polyol (1) of the present invention, which process comprises the steps of (i) reacting at least one polyester polyol (1) of the present invention, at least one polymeric polyol (2i) different from polyester polyol (1)

at least one polyol (2ii) having a molecular weight of below 400 g/mol, at least one polyol (2iiia) carrying at least one acidic group, optionally at least one alcohol or polyol (2iv) carrying at least one ethylenically unsaturated group and at least one polyisocyanate (2v), and optionally in the presence of an organic solvent (4) and/or at least one compound carrying at least one olefinically unsaturated group and no NCO reactive groups (2vii) to form a polyurethane prepolymer, (ii) followed by optional addition of an organic solvent (4), treatment with at least one polyamine (2vi) carrying at least two amino groups independently selected from the group consisting of primary and secondary amino groups, treatment with at least one base to completely or partially convert the acidic groups derived from the polyol (2iiia) carrying at least one acidic group to the salt thereof, and addition of water (iii) if organic solvent (4) is present in the product of the second step, removing all or part of organic solvent (4), (iv) optionally adding the at least one compound (2vii) carrying at least one olefinically unsaturated group and no NCO reactive groups to the product of the third step, and (v) optionally polymerizing compound (2vii) in the presence of an initiator, to form the the aqueous polyurethane dispersion (PUD) of the present invention.

The first step is usually performed at a temperature in the range of from 50 to 150° C., more preferably in the range of 70° C. to 110° C. The reaction time is usually between 30 minutes and 10 hours.

The first step is preferably performed in the presence of a catalyst.

Examples of catalysts are amine catalysts carrying at least one tertiary amino group and organometal catalysts.

Examples of amine catalysts carrying at least one tertiary amino group are 1,4-diazabicyclo-[2.2.2]octane, N-methylmorpholine, N-methylimidazole, bis[2-(N,N-dimethylamino)ethyl] ether, 2,2'-dimorpholinyldiethylether and tetramethylethylenediamine, dimethylcyclohexylamine, dimethylbenzylamine, dimethylethanolamine and dimethylaminopropyl amine. A preferred amine catalysts carrying at least one tertiary amino group are is 1,4-diazabicyclo[2.2.2]octane.

Examples of organometallic catalysts are organo titanium catalysts, organo tin catalysts, organo zinc catalysts, organo bismuth catalysts, organo zirconium catalysts, organo iron catalysts, organo aluminum catalysts, organo manganese catalysts, organium nickel catalysts, organo cobalt catalysts, organo molybdenum catalysts, organo tungsten catalysts and organo vanadium catalysts.

The organo titanium catalysts can be titanium(IV) tetra($C_{1-10}$-alkoxide), and preferably titanium(IV) tetra($C_{1-6}$-alkoxide). $C_{1-6}$-alkoxide and $C_{1-10}$-alkoxide can be branched or unbranched. Examples of $C_{1-6}$-alkoxide are methoxide, ethoxide, propoxide, isipropoxide, butoxide, isobutoxide, sec-butoxide, tert-butoxide, pentoxide, hexoxide. Examples of $C_{1-10}$-alkoxide are methoxide, ethoxide, propoxide, isipropoxide, butoxide, isobutoxide, sec-butoxide, tert-butoxide, pentoxide, hexoxide, heptoxide, octoxide, 2-ethylhexoxide, nonoxide, decoxide. Examples of titanium (IV) tetra($C_{1-4}$-alkoxide) are titanium(IV) tetra(isopropoxide) and titanium(IV) tetra(butoxide).

Examples of organo tin catalyst are tin(II) di($C_{2-20}$-alkanoates) such as tin(II) diacetate, tin(II) di(2-ethylhexanoate) and tin(II) dilaurate, di($C_{1-10}$-alkyl) tin(IV) di($C_{1-20}$-alkanoates) such as dimethyltin(IV) diacetate, dibutyltin(IV) diacetate, dibutyltin(IV)dibutyrate, dibutyltin di(2-ethylhexanoate), dibutyltin(IV) dilaurate, dioctyltin(IV) dilaurate and dioctyltin(IV) diacetate, di($C_{1-10}$-alkyl) tin(IV) oxide such as dibutyl tin(IV) oxide and diphenyl tin(IV) oxide, di($C_{1-10}$-alkyl) tin(IV) dihalide such as dibutyltin(IV) dichloride, and di($C_{1-10}$-alkyl) tin(IV) (diacid) such as dibutyl tin(IV) maleate.

$C_{2-10}$-alkanoates can be branched or unbranched. Examples of $C_{2-20}$-alkanoates are acetate, propionate, butyrate, pentanoate, pivalate, hexanoate, heptanoate, octanoate, 2-ethylhexanoate (octoate), nonanoate, decanoate, neodecanoate and dodecanoate (laurate).

Examples of organo zinc catalyst are a zinc(II) di($C_{2-20}$-alkanoate) such as zinc(II) diacetate, zinc(II) di(2-ethylhexanoate) and zinc(II) dineodecanoate.

Examples of organo bismuth catalyst are a bismuth(II) di($C_{2-20}$-alkanoate) such as bismith(II) diacetate, bismuth (II) dipivalate, bismuth(II) di(2-ethylhexanoate) and bismuth(II) dineodecanoate.

Examples organo zirconium catalysts are zirconium(IV) tetra(acetylacetonate) and zirconium(IV) etrakis(2,2,6,6-tetramethyl-3,5-heptanedionate).

The catalyst is preferably an organometal catalyst, more preferably an organo titanium catalyst, even more preferably titanium(IV) tetra($C_{1-6}$-alkoxide) and most preferably titanium(IV) tetra(butoxide).

The NCO content of the polyurethane prepolymer of the first step is usually in the range of 1.1% to 1.5%.

The second step comprises the following "sub-steps":

optional addition of an organic solvent, treatment with at least one polyamine (2vi) carrying at least two amino groups independently selected from the group consisting of primary and secondary amino groups, treatment with at least one base to completely or partially convert the acidic groups derived from the polyol (2iiia) carrying at least one acidic group to the salt thereof, addition of water.

The "sub"-steps of the second step can be performed in any order, but preferably the sub-steps are performed in the indicated order.

The treatment with at least one polyamine (2vi) is usually performed at a temperature in the range of from 20 to 100° C., more preferably in the range of 20° C. to 50° C., most preferably in the range of from 20 to 40° C. The reaction time of the treatment with at least one polyamine carrying at least two amino groups independently selected from the group consisting of primary and secondary amino groups (2vi) is usually between 2 minutes and 1 hour.

The base can be an inorganic base, ammonia or an amine carrying only one amino group. Examples of inorganic base and of amine carrying only one amino group are given above. The treatment with at least one base is usually performed at a temperature in the range of from 20° C. to 60° C., most preferably in the range of from 20 to 40° C. The reaction time of the treatment with at least one base is usually between 1 minute and 1 hour.

In the third step any organic solvent present is usually removed by distillation.

The initiator of the fifth step can be any suitable initiator or a mixture thereof.

The initiator can be a peroxide-type initiator such as potassium peroxodisulate, sodium peroxodiulfate, ammonium peroxodisulfate, hydrogen peroxide and tert-butyl hydroperoxide, and mixtures thereof.

The initiator can be an azo-type initiator such as 2,2'-azobis(2-amidoisopropane)dihydro-chloride, 2,2'-azobis(N,N'-dimethyleneisobutyramidine)dihydrochloride and 2,2'-azobis(4-cyanopentanoic acid), and mixtures thereof.

The initiator can be a redox initiator system-type initiator such as a combination of an oxidizing compound with a reducing compound. Examples of oxidizing compounds are the peroxide-type initiators listed above. Examples of reducing compounds are reducing sulfur compounds such as alkali metal or ammonium bisulfites, sulfites, thiosulfates, dithionites or tetra-thionates, as well as alkali metal hydroxymethanesulfinate dihydrates and thiourea. An example of a redox initiator initiator system type initiator is the combination of ammonium peroxodisulfate and ammonium disulfite. The weight ratio of oxidizing compound to the reducing compound is preferably 50:1 to 0.05:1.

The peroxide-type initiators, the azo-type initiators and the redox initiator system-type initiators can be combined with a transition metal catalysts, for example iron salts, nickel salts, cobalt salts, manganese salts, copper salts, vanadium salts, chromium salts, such as iron(II) sulfate, cobalt(II) chloride, nickel(II) sulfate, copper(I) chloride, manganese(II) acetate, vanadium(III) acetate, manganese(II) chloride. An example is the combination of hydrogen peroxide with ammonium iron(II) sulfate.

The peroxide-type initiators, the azo-type initiators and the redox initiator system-type initiators are preferably used in an amount of 0.05 to 20 weight %, preferably 0.05 to 10 weight %, more prefer-ably 0.1 to 5 weight %, based on the total weight of the compound carrying at least one olefinically unsaturated group and no NCO reactive groups (2vii). The transition metal salts, if present, are typically used in amounts of 0.1 to 1000 ppm.

The polymerization of the fifth step is usually performed at a temperature in the range of from 0 to 160° C., preferably in the range of from 60 to 100° C.

Also part of the present invention is a process for the preparation of the aqueous self-crosslinkable polyurethane dispersion (SC-PUD) of the present invention comprising at least one polyurethane (2) carrying at least one keto-type C═O group, at least one compound (3) carrying at least two keto-type C═O group reactive groups, and optionally at least one organic solvent (4), wherein the polyurethane (2) carrying at least one keto-type C═O group comprises units derived from at least one polyester polyol (1) of the present invention, which process comprises the steps of the process for the preparation the aqueous polyurethane dispersion (PUD) of the present invention, and in additional step (vi) of adding at least one compound (3) carrying at least two keto-type C═O group reactive groups.

Also part of the present invention is an aqueous self-crosslinkable polyurethane coating composition comprising the aqueous self-crosslinkable polyurethane dispersion (SC-PUD) of the present invention, optionally at least an organic solvent (5), at least one coating composition additive (6), optionally at least one polymer (7) different from the polyurethane (2), and optionally at least one monomer (8) carrying at least one olefinically unsaturated group.

Preferably, the aqueous self-crosslinkable polyurethane coating composition of the present invention comprises 50 to 99 weight % of the aqueous self-crosslinkable polyurethane dispersion (SC-PUD) of the present invention 0 to 10 weight % of at least an organic solvent (5), 0.1 to 10 weight % of at least one coating composition additive (6), 0 to 50 weight % of at least one polymer (7) different from the polyurethane (2), and 0 to 40 weight % of at least one monomer (8) carrying at least one olefinically unsaturated group, based on the weight of aqueous self-crosslinkable polyurethane dispersion of the present invention, (5), (6), (7) and (8).

More preferably, the aqueous self-crosslinkable polyurethane coating composition of the present invention comprises 60 to 98 weight % of the aqueous self-crosslinkable polyurethane dispersion (SC-PUD) of the present invention 1 to 8 weight % of at least an organic solvent (5), 0.1 to 8 weight % of at least one coating composition additive (6), 0 weight % of at least one polymer (7) different from the polyurethane (2), and 0 weight % of at least one monomer (8) carrying at least one olefinically unsaturated group, based on the weight of aqueous self-crosslinkable polyurethane dispersion of the present invention, (5), (6), (7) and (8).

Most preferably, the aqueous self-crosslinkable polyurethane coating composition of the present invention comprises 70 to 98 weight % of the aqueous self-crosslinkable polyurethane dispersion (SC-PUD) of the present invention, 1 to 6 weight % of at least an organic solvent (5), 0.1 to 5 weight % of at least one coating composition additive (6), 0 weight % of at least one polymer (7) different from the polyurethane (2), and 0 weight % of at least one monomer (8) carrying at least one olefinically unsaturated group, based on the weight of aqueous self-crosslinkable polyurethane dispersion of the present invention, (5), (6), (7) and (8).

Examples of organic solvent (5) are glycol ether, alcohols, esters and hydrocarbons.

Examples of glycol ether are ethylene glycol monomethyl ether, diethylene glycol monomethylether, diethylene glycol monom butyl ether, propylene glycol methyl ether and dipropylene glycol methyl ether, ethyleneglycol dimethyl ether and ethyleneglycol diethylether, ethylene glycol methyl ether actate and propyleneglycol methyl ether acetate.

Examples of alcohols are benzyl alcohol, butanol, 2-ethylhexanol. Examples of esters are methyl acetate, ethyl acetate and butyl acetate. Examples of hydrocarbons are white spirit, n-heptane, cyclohexane, toluene, ortho-xylene, meta-xylene, para-xylene, and xylene isomer The organic solvent (5) is preferably a glycol ether.

Examples of coating composition additive (6) are matting agents, nanoparticles, dispersants, thickening agents, wetting agents, surface active components like emulsifiers, defoamers, pigments and pigment pastes.

An example of a matting agent is Acematt®TS 100 (pyrogenic silicic acid).

An example of a wetting agent is Hydropalat® WE 3221.

An example of a defoamer is FoamStar® ST 2454.

Examples of polymers (7) different from the polyurethane (2) are polyurethanes carrying keto-type C═O group, but not comprising units derived from at least one polyester polyol (1) carrying at least one keto-type C═O group derived from HO—C(═O)-$L^1$-C(═O)—$R^1$ (1i) or from a derivative thereof, wherein $L^1$ is a linking group and $R^1$ is selected from the group consisting of $C_{1-10}$-alkyl, $C_{5-8}$-cycloalkyl, $C_{6-10}$-aryl and $C_{7-12}$-aralkyl, and also polyurethanes carrying no keto-type C═O group, polyacrylates, polyurethane/polyacrylate copolymers, polyesters, polyethers, polycarbonates, polyisocyanates.

Examples of monomer (8) carrying at least one olefinically unsaturated group are the compounds (2vii) carrying at least one olefinically unsaturated groups and no NCO reactive group, and the alcohols or polyols (2iv) carrying at least one ethylenically unsaturated group. The compounds (2vii) and (2iv) are described above. Preferably, the monomers (7) are compounds carrying at least two olefinically unsaturated groups and no NCO reactive group, and alcohols or polyols carrying at least two ethylenically unsaturated groups. Examples of these compounds are given above.

The aqueous self-crosslinkable polyurethane coating composition of the present invention can be prepared by mixing the ingredients, usually at room temperature. The pH of the aqueous self-crosslinkable coating composition of the present invention can be adjusted when necessary. Preferably, the pH is adjusted to a pH of 6 to 10, more preferably to a pH of 7 to 9.

Also part of the present invention are substrates coated with the aqueous self-crosslinkable polyurethane coating composition of the present invention.

The substrate can be any suitable substrates. The substrate can be wood, plastic, metal, paper, glass, textiles, leather, fiber reinforced composites and mixtures thereof. The substrate can have the form of housings and other structural parts used to build vehicles, for example automobiles or used in all types of industrial and domestic applications. The substrate is preferably wood, more preferably wood used in interior application such as parquet flooring.

Also part of the present invention is a process for coating a substrate, which comprises the step of applying the aqueous self-crosslinkable polyurethane coating composition of the present invention to a substrate.

The aqueous self-crosslinkable coating composition of the present invention can be applied to the substrate by any method known in the art, for example by using a film applicator, to form a layer.

The layer usually has a thickness in the range od 100 to 150 μm.

The layer usually is applied and allowed to cross-link at a temperature in the range of 5 to 40° C. and at a relative humidity in the range of 10 to 90%.

In a preferred embodiment, the layer is applied and allowed to cross-link at a temperature in the range of 5 to 20° C., preferably 8 to 18° C., and at a relative humidity in the range of 45 to 85%.

The aqueous self-crosslinkable polyurethane coating compositions of the present invention are advantageous in that the compositions are able to crosslink under various conditions with regard to temperature and relative humidity to form a homogenous crack-free film. The aqueous self-crosslinkable polyurethane coating compositions of the present invention are not only able to crosslink under ambient conditions, such as at temperatures in the range of 20 to 23° C. and at relative humidities in the range of 20% to 50%, but also under conditions where the temperatures are low, such as in the range of 10 to 17° C., and, at the same time, the relative humidity is high, such as in the range of 50 to 80%.

The aqueous self-crosslinkable polyurethane coating compositions of the present invention are also advantageous in that the formed films are resistant against water treatment for 24 hours.

The aqueous self-crosslinkable polyurethane coating compositions of the present invention, comprising at least one polyurethane (2) carrying at least one keto-type C═O group, wherein the at least one polyurethane (2) carrying at least one keto-type C═O group comprises units derived from at least one polyester polyol (1), wherein the polyester polyols (1) carries at least one keto-type C═O group derived from HO—C(═O)-$L^1$-C(═O)—$R^1$ (1i) or from a derivative thereof, wherein $L^1$ is a $CH_2CH_2$ group and $R^1$ is $CH_3$ (levulinic acid) are advantageous in that levulinic acid can be derived from renewable material such as starch.

The aqueous self-crosslinkable polyurethane coating compositions of the present invention are also advantageous in that no external cross-linker is required.

The aqueous self-crosslinkable polyurethane coating compositions of the present invention are also advantageous in that the compositions contain only a low amount of organic solvent, preferably maximum 10 weight %, more preferably maximum 8 weight %, most preferably maximum 5 weight % of an organic solvent based on the weight of the composition.

The aqueous self-crosslinkable polyurethane coating compositions of the present invention are are also storage stable, fast drying, show a high chemical resistance, high abrasion resistance, and/or a high final hardness.

The aqueous self-crosslinkable polyurethane coating compositions of the present invention also shows a high resistance against organic solvents such as acetone and ethanol.

EXAMPLES

Example 1

Preparation of Polyester Polyols 1a Carrying at Least One Keto-Type C═O Group

A mixture of 36.45 kg levulinic acid and 23.64 kg 1,4-cyclohexane dimethanol (cis/trans mixture) was melted at 60° C. 50.98 kg adipic acid and 39.33 kg trimethylolpropane were added and the reaction mixture was heated under stirring and inert atmosphere at 100° C. until a clear solution was obtained (approximately 4 hours). A solution of 0.045 kg titanium (IV) butoxide in 500 mL methylethylketone was added. The reaction mixture was heated under stirring to 160° C. and kept for 3 hours at this temperature. Vacuum (300 mbar) was applied, and the reaction mixture was heated under stirring at 200° C. until an acid number of 10 mg KOH/g was reached (approximately 12 hours). The vacuum was disrupted, and the reaction mixture was cooled to 170° C. 4.78 kg Cardura E10P (neodecanoic acid, 2,3-epoxypropyl ester) was added and the reaction mixture was heated under stirring at 170° C. until an acid number of 2 mg KOH/g was reached (approximately 6 hours), and then cooled to 90° C. to yield keto polyester polyol 1a (number average molecular weight: 2700 g/mol, OH-functionality: 4, acid number: 3 mg KOH/g, keto-type C═O group-density: 0.205 mmol/g keto polyester polyol 1a).

Example 2

Preparation of an Aqueous Self-Crosslinkable Polyurethane Dispersion (SC-PUD2a) Comprising Polyurethane 2a Carrying at Least One Keto-Type C═O Group, and Adipic Acid Dihydrazide (ADDH) (3a)

47.6 g dimethylolpropionic acid (DMPA), 230 g of a polyester diol formed from adipic acid, isophthalic acid, 1,6-hexandiol, number average molecular weight Mn: 2000 g/mol, OH number: 56 mg KOH/g, 100 g of polyester polyol 1a of example 1, 74.8 g 1,4-butandiol and 100 g acetone were mixed at 65° C. 366.3 g isophorone diisocyanate was added, the temperature was increased to 90° C., and the reaction mixture was allowed to react for 2 hours. The mixture was diluted with 790 g acetone, and the NCO content was measured (1.46%). 3.9 g isophorone diamine (IPDA) was added to the mixture and the reaction mixture was allowed to react for 5 min. 33.3 g diethanolethylamine (DEEA) was added to the mixture and the reaction mixture was allowed to react for 5 min. 1400 g Water was added to the reaction mixture under rapid stirring to obtain a dispersion of the polyurethane in water. 10.5 g diethylenetriamine (DETA) was added and the reaction mixture was allowed to react for 15 min. Acetone was removed by distillation. Then, 110 g of a solution of adipic acid dihydrazide (ADDH) (12 wt % ADDH in water) was added to the dispersion to obtain an aqueous self-crosslinkable polyurethane dispersion (SC-PUD2a) comprising polyurethane 2a and adipic acid dihydrazide (ADDH) (3a) (solid content: 37 wt %, viscosity at 23° C.: 80-200 mPas, pH: 7.5-8.5, minimum film forming temperature: 19° C., particle size: 100 nm).

Example 3

Preparation of an Aqueous Self-Crosslinkable Polyurethane Dispersion (SC-PUD2b) Comprising Polyurethane 2b Carrying at Least One Keto-Type C═O Group, and Adipic Acid Dihydrazide (ADDH) (3a)

43.89 g dimethylolpropionic acid (DMPA), 265 g of a polyester diol formed from adipic acid, isophthalic acid, 1,6-hexandiol, MW: 2000 g/mol, OH number: 56 mg KOH/g, 100 g of polyester polyol 1a of example 1, 73.35 g 1,4-butandiol and 100 g acetone were mixed at 65° C. 356.31 g isophorone diisocyanate was added, the temperature was increased to 90° C., and the reaction mixture was allowed to react for 2 hours. The mixture was diluted with 800 g acetone, and the NCO content was measured (1.27%). 3.91 g isophorone diamine (IPDA) was added to the mixture and the reaction mixture was allowed to react for 5 min. 34.57 g diethanolethylamine (DEEA) was added to the mixture and the reaction mixture was allowed to react for 5 min. 1600 g Water was added to the reaction mixture under rapid stirring to obtain a dispersion of the polyurethane in water. 9.1 g diethylenetriamine (DETA) was added and the reaction mixture was allowed to react for 15 min. Acetone was removed by distillation. Then, 110 g of a solution of adipic acid dihydrazide (ADDH) (12 wt % ADDH in water) was added to the dispersion to obtain an aqueous self-crosslinkable polyurethane dispersion (SC-PUD2b) comprising polyurethane 2b and adipic acid dihydrazide (ADDH) (3a) (solid content: 37 wt %, viscosity at 23° C.: 80-200 mPas, pH: 7.5-8.5, minimum film forming temperature: 15-17° C., particle size ~100 nm).

Example 4

Preparation of an Aqueous Self-Crosslinkable Polyurethane Dispersion (SC-PUD2c) Comprising Polyurethane 2c Carrying at Least One Keto-Type C═O Group, and Adipic Acid Dihydrazide (ADDH) (3a)

40.2 g dimethylolpropionic acid (DMPA), 300 g of a polyester diol formed from adipic acid, isophthalic acid, 1,6-hexandiol, MW: 2000 g/mol, OH number: 56 mg KOH/g, 100 g of the polyester polyol 1a of example 1, 72.0 g 1,4-butandiol and 100 g acetone were mixed at 65° C. 346.6 g isophorone diisocyanate was added, the temperature was increased to 90° C., and the reaction mixture was allowed to react for 2 hours. The mixture was diluted with 800 g acetone, and the NCO content was measured (1.16%). 4.0 g isophorone diamine (IPDA) was added to the mixture and the reaction mixture was allowed to react for 5 min. 36.1 g diethanolethylamine (DEEA) was added to the mixture and the reaction mixture was allowed to react for 5 min. 1600 g Water was added to the reaction mixture under rapid stirring to obtain a dispersion of the polyurethane in water. 7.75 g diethylenetriamine (DETA) was added and the reaction mixture was allowed to react for 15 min. Acetone was removed by distillation. Then, 110 g of a solution of adipic acid dihydrazide (ADDH) (12 wt % ADDH in water) was added to the dispersion to obtain an aqueous self-crosslinkable polyurethane dispersion (SC-PUD2c) comprising keto polyurethane 2c and adipic acid dihydrazide (ADDH) (solid content: 37 wt %, viscosity at 23° C.: 80-200 mPas, pH: 7.5-8.5, minimum film forming temperature: 11-14° C., particle size ~100 nm).

Examples 5

Preparation of Matting Coating Compositions Comprising the Aqueous Self-Crosslinkable Polyurethane Dispersions SC-PUD2a, SC-PUD2b and SC-PUD2c of Examples 2, 3 and 4, Respectively, and 5 Weight % Organic Solvent Mixture Dowanol™DpnB/Dowanol™ DPM in a Weight Ratio 4/1

The pH of 93.4 weight parts of the aqueous self-cross-linkable polyurethane dispersion SC-PUD2a of example2, SC-PUD2b of example 3 and SC-PUD 2c of example 4, respectively, was adjusted to 8.5 using N,N-dimethylaminoethanol (DMEA), 1.0 weight parts Acematt®TS 100 (pyrogenic silicic acid), 4.0 weight parts Dowanol™DpnB (slow-evaporating, hydrophobic glycol ether), 1.0 weight parts Dowanol™ DPM (dipropylene glycol methyl ether), 0.3 weight parts Hydropalat® WE 3221 (silicone surfactant) and 0.3 weight parts FoamStar® ST 2454 were added and mixed at room temperature.

Comparative Example 5

A comparative matting coating composition was prepared in analogy to the matting coating compositions of example 5, but using NeoRez® R-2180 (DSM Coating Resins LLC, aliphatic, self-cross-linking, water-based polyurethane, acid value: 0, solid content: 38.0 wt %, viscosity at 23° C.: 25-150 mPas, pH: 7.4-8.4) instead of SC-PUD2a, SC-PUD2b and SC-PUD2c of examples 2, 3 and 4, respectively.

Example 6

Preparation of a Matting Coating Composition Comprising the Aqueous Self-Crosslinkable Polyurethane Dispersions SC-PUD2a, SC-PUD2b and SC-PUD2c of Examples 2, 3 and 4, Respectively, and 3 Weight % Organic Solvent Organic Solvent Mixture Dowanol™DpnB/Dowanol™ DPM in a Weight Ratio 4/1

The pH of 95.4 weight parts of the aqueous self-cross-linkable polyurethane dispersion SC-SUD2a of example2, SC-PUD2b of example 3 and SC-PUD 2c of example 4, respectively, was adjusted to 8.5 using N,N-dimethylaminoethanol (DMEA), 1.0 weight parts Acematt®TS 100 (pyrogenic silicic acid), 2.4 weight parts Dowanol™DpnB (slow-evaporating, hydrophobic glycol ether), 0.6 weight parts Dowanol™ DPM (dipropylene glycol methyl ether), 0.3 weight parts Hydropalat® WE 3221 (silicone surfactant) and 0.3 weight parts FoamStar® ST 2454 were added and mixed at room temperature.

Comparative Example 6

A comparative matting coating composition was prepared in analogy to the matting coating compositions of example 6, but using NeoRez® R-2180 (DSM Coating Resins LLC, aliphatic, self-cross-linking, water-based polyurethane, acid value: 0, solid content: 38.0 wt %, viscosity at 23° C.: 25-150 mPas, pH: 7.4-8.4) instead of SC-PUD2a, SC-PUD2b and SC-PUD2c of examples 2, 3 and 4, respectively.

Example 7

Preparation of Matting Coating Compositions Comprising the Aqueous Self-Crosslinkable Polyurethane Dispersions SC-PUD2a, SC-PUD2b and SC-PUD2c of Examples 2, 3 and 4, Respectively, and 5 Weight % Organic Solvent Mixture Dowanol™DpnB/Dowanol™ DPM in a Weight Ratio 1/4

The pH of 93.4 weight parts of the aqueous self-cross-linkable polyurethane dispersion SC-PUD2a of example2, SC-PUD2b of example 3 and SC-PUD 2c of example 4, respectively, was adjusted to 8.5 using N,N-dimethylaminoethanol (DMEA), 1.0 weight parts Acematt®TS 100 (pyrogenic silicic acid), 1.0 weight parts Dowanol™DpnB (slow-evaporating, hydrophobic glycol ether), 4.0 weight parts Dowanol™ DPM (dipropylene glycol methyl ether), 0.3 weight parts Hydropalat® WE 3221 (silicone surfactant) and 0.3 weight parts FoamStar® ST 2454 were added and mixed at room temperature.

Comparative Example 7

A comparative matting coating composition was prepared in analogy to the matting coating compositions of example 7, but using NeoRez® R-2180 (DSM Coating Resins LLC, aliphatic, self-cross-linking, water-based polyurethane, acid value: 0, solid content: 38.0 wt %, viscosity at 23° C.: 25-150 mPas, pH: 7.4-8.4) instead of SC-PUD2a, SC-PUD2b and SC-PUD2c of examples 2, 3 and 4, respectively.

Example 8

Preparation of Matting Coating Compositions Comprising the Aqueous Self-Crosslinkable Polyurethane Dispersions SC-PUD2a, SC-PUD2b and SC-PUD2c of Examples 2, 3 and 4, Respectively, and 3 Weight % Organic Solvent Mixture Dowanol™DpnB/Dowanol™ DPM in a Weight Ratio 1/4

The pH of 95.4 weight parts of the aqueous self-cross-linkable polyurethane dispersion SC-PUD2a of example2, SC-PUD2b of example 3 and SC-PUD 2c of example 4, respectively, was adjusted to 8.5 using N,N-dimethylaminoethanol (DMEA), 1.0 weight parts Acematt®TS 100 (pyrogenic silicic acid), 0.6 weight parts Dowanol™DpnB (slow-evaporating, hydrophobic glycol ether), 2.4 weight parts Dowanol™ DPM (dipropylene glycol methyl ether), 0.3 weight parts Hydropalat® WE 3221 (silicone surfactant) and 0.3 weight parts FoamStar® ST 2454 (defoamer) were added and mixed at room temperature.

Comparative Example 8

A comparative matting coating composition was prepared in analogy to the matting coating compositions of example 8, but using NeoRez® R-2180 (DSM Coating Resins LLC, aliphatic, self-cross-linking, water-based polyurethane, acid value: 0, solid content: 38.0 wt %, viscosity at 23° C.: 25-150 mPas, pH: 7.4-8.4) instead of SC-PUD2a, SC-PUD2b and SC-PUD2c of examples 2, 3 and 4, respectively.

Example 9

Analysis of the Film Forming Behaviour of the Matting Coating Compositions of Examples 5 to 8 and Comparative Examples 5 to 8 on Absorbing Parquet Wood Substrates The surface of parquet wood board samples (30×15 cm) were polished using sandpaper (grain size 150). 1.8 g of a wood stain (Loba ProColor, 900005 Black, Lobadur) was applied on the surface of each wood board sample using a metal spatula. The wood board samples were allowed to dry over the weekend at room temperature (approximately 60 hours).

The coated wood board samples were then conditioned under the conditions described in tables 1 and 2 for 24 hours before the matting coating compositions were applied.

The matting coating compositions were applied on the wood board samples using a film applicator to yield a 120 μm thick film, which was allowed to dry for 5 hours under the conditions described in tables 1 and 2. Then, the matting coating compositions were applied a second time to yield a new 120 μm thick film, which was allowed to dry overnight (approximately 12 h), again under the conditions described in tables 1 and 2 The surface of wood board samples was polished lightly using sandpaper (grain size 150), and the matting coating compositions were applied a third time to yield a new 120 μm thick film, which was allowed to dry for 7 days, again under the conditions described in tables 1 and 2.

The coated wood board samples were treated with water for 24 hours in laboratory atmosphere, and the coating layer formed from the matting coating compositions was analyzed directly after the water treatment by visual inspection. The film formation behaviour of the coating compositions was ranked from score 1 (worst film formation) to score 5 (best film formation).

Score 1: microcrack “networks” overall the surface

Score 2: mostly groups of microcrack “networks”

Score 3: small single microcracks, first groups of microcrack “networks”

Score 4: small single microcracks

Score 5: homogeneous, crack-free film

The scores for the coating compositions of examples 5 and 6 and comparative examples 5 and 6 are summarized in table 1.

Table 1 shows that the film formation behavior at temperatures from 21 to 23° C. and at 20 to 50% relative humidities, and after 24 h water treatment of the dryed film, of the inventive coating compositions of example 5 comprising the aqueous self-crosslinkable polyurethane dispersions SC-PUD2a, SC-PUD2b and SC-PUD2c of examples 2, 3 and 4, respectively, and 5 weight % organic solvent mixture Dowanol™DpnB/Dowanol™ DPM in a weight ratio 4/1 is ranked with the highest score (score 5) and is comparable to the film forming behavior of comparative coating composition of comparative example 5 comprising the aqueous dispersion NeoRez® R-2180 (DSM Coating Resins LLC).

Table 1 shows that the film formation behavior at temperatures from 10 to 17° C. and at 50 to 80% relative humidities, and after 24 h water treatment of the dryed film, of the inventive coating compositions of example 5 comprising the aqueous self-crosslinkable polyurethane dispersions SC-PUD2a, SC-PUD2b and SC-PUD2c of examples 2, 3 and 4, respectively, and 5 weight % organic solvent mixture Dowanol™DpnB/Dowanol™ DPM in a weight ratio 4/1 is ranked with the highest score (score 5) and is better than the film forming behavior of comparative coating composition of comparative example 5 comprising the aqueous dispersion NeoRez® R-2180 (DSM Coating Resins LLC).

Table 1 also shows that the film formation behaviour at temperatures from 10 to 17° C. and at 50 to 80% relative humidities, and after 24 h water treatment of the dryed film, of the inventive coating compositions of example 6 comprising the aqueous self-crosslinkable polyurethane dispersions SC-PUD2a, SC-PUD2b and SC-PUD2c of examples 2, 3 and 4, respectively, and only 3 weight % organic solvent mixture Dowanol™DpnB/Dowanol™ DPM in a weight ratio 4/1 is slightly worse than that of the inventive coating compositions of example 5 comprising 5 weight % organic solvent, but much better than that of comparative coating composition of comparative example 6 comprising the aqueous dispersion NeoRez® R-2180 (DSM Coating Resins LLC) and 3 weight % organic solvent.

The scores for the coating compositions of examples 7 and 8 and comparative examples 7 and 8 are summarized in table 2.

TABLE 1

| | | Ex. 5 | | | Comp ex 5 | Ex 6 | | | Comp ex 6 |
|---|---|---|---|---|---|---|---|---|---|
| | | SC-PUD | | | | | | | |
| | | SC-PUD 2a | SC-PUD2b | SC-PUD2c | NeoRez ® R-2180 | SC-PUD2a | SC-PUD2b | SC-PUD2c | NeoRez ® R-2180 |
| | | DpnB/DPM (4/1) [wt %] | | | | | | | |
| T [° C.] | r.h. [%] | 5 | 5 | 5 | 5 | 3 | 3 | 3 | 3 |
| | | Score | | | | | | | |
| 23 | 50 | 5 | 5 | 5 | 5 | nd | nd | nd | nd |
| 23 | 20 | nd | 5 | 5 | nd | nd | nd | 4 | nd |
| 21 | 50 | 5 | 5 | 5 | nd | nd | nd | 4 | nd |
| 17 | 50 | 5 | 5 | 5 | 4 | 4 | 4 | 4 | 2 |
| 15 | 50 | 5 | 5 | 5 | 4 | 4 | nd | nd | nd |
| 13 | 80 | 5 | 5 | 5 | 4 | 4 | 4 | 4 | 2 |
| 13 | 50 | 5 | 5 | 5 | 3 | 4 | 5 | 5 | 1 |
| 10 | 80 | 5 | 5 | 5 | 3 | 3 | 4 | 4 | 2 |

nd = not determined.

r.h. = relative humidity.

TABLE 2

| | | Ex 7 | | | Comp ex 7 | Ex 8 | | | Comp ex 8 |
|---|---|---|---|---|---|---|---|---|---|
| | | SC-PUD | | | | | | | |
| | | SC-PUD 2a | SC-PUD2b | SC-PUD2c | NeoRez ® R-2180 | SC-PUD2a | SC-PUD2b | SC-PUD2c | NeoRez ® R-2180 |
| | | DpnB/DPM (1/4) [wt %] | | | | | | | |
| T [° C.] | r.h. [%] | 5 | 5 | 5 | 5 | 3 | 3 | 3 | 3 |
| | | Score | | | | | | | |
| 17 | 50 | 5 | 5 | 5 | 4 | 4 | 5 | 5 | 2 |
| 13 | 80 | 5 | 5 | 5 | 4 | 3 | 4 | 4 | 3 |
| 13 | 50 | 5 | 5 | 5 | 4 | 4 | 5 | 4 | 1 |
| 10 | 80 | 5 | 5 | 5 | 3 | 4 | 4 | 4 | 2 |

Table 2 shows that the film formation behavior at temperatures from 10 to 17° C. and at 50 to 80% relative humidities, and after 24 h water treatment of the dryed film, of the inventive coating compositions of example 7 comprising the aqueous self-crosslinkable polyurethane dispersions SC-PUD2a, SC-PUD2b and SC-PUD2c of examples 2, 3 and 4, respectively, and 5 weight % organic solvent mixture Dowanol™DpnB/Dowanol™ DPM in a weight ratio 1/4 is ranked with the highest score (score 5) and is better than the film forming behavior of comparative coating composition of comparative example 7 comprising the aqueous dispersion NeoRez® R-2180 (DSM Coating Resins LLC).

Table 2 also shows that the film formation behaviour at temperatures from 10 to 17° C. and at 50 to 80% relative humidities, and after 24 h water treatment of the dryed film, of the inventive coating compositions of example 8 comprising the aqueous self-crosslinkable polyurethane dispersions SC-PUD2a, SC-PUD2b and SC-PUD2c of examples 2, 3 and 4, respectively, and only 3 weight % organic solvent mixture Dowanol™DpnB/Dowanol™ DPM in a weight ratio ¼ is slightly worse than that of the inventive coating compositions of example 7 comprising 5 weight % organic solvent, but much better than that of comparative coating composition of comparative example 8 comprising the aqueous dispersion NeoRez® R-2180 (DSM Coating Resins LLC) and 3 weight % organic solvent.

The invention claimed is:

1. An aqueous polyurethane dispersion comprising at least one polyurethane carrying at least one keto-type C═O group, and optionally at least one organic solvent, wherein the at least one polyurethane carrying at least one keto-type C═O group comprises units derived from at least one polyester polyol comprising units derived from 5 to 50 weight % of HO—C(═O)-L$^1$-C(═O)—R$^1$ (1i) or derivative thereof, wherein L$^1$ is a linking group and R$^1$ is selected from the group consisting of $C_{1-20}$-alkyl, $C_{5-8}$-cycloalkyl, $C_{6-10}$-aryl and $C_{7-20}$-aralkyl, 5 to 60 weight % of at least one diacid (ii) or derivative thereof, 0 to 30 weight % of at least one polyacid (1iii) carrying at least three COOH groups or derivative thereof, 5 to 50 weight % of at least one diol (1iv), 5 to 50 weight % of at least one polyol (1v) carrying at least three OH groups and 0 to 20 weight % of at least compound (1vi) comprising at least one epoxy group, based on the weight of the sum of (1i), (1ii), (1iii), (1iv) (1v) and (1vi).

2. The aqueous polyurethane dispersion of claim 1 comprising 5 to 90 weight % of at least one polyurethane carrying at least one keto-type C═O group, 20 to 95 weight % of water, and 0 to 5 weight % of organic solvent, based on the weight of the at least one polyurethane, water and organic solvent, wherein the at least one polyurethane carrying at least one keto-type C—O group comprises units derived from the at least one polyester polyol.

3. An aqueous self-crosslinkable polyurethane dispersion comprising at least one polyurethane (2) carrying at least one keto-type C═O group, at least one compound (3) carrying at least two keto-type C═O group reactive groups, water, and optionally at least one organic solvent, wherein the at least one polyurethane carrying at least one keto-type C═O group comprises units derived from at least one polyester polyol comprising units derived from 5 to 50 weight % of HO—C(═O)-L$^1$-C(═O)—R$^1$ (1i) or derivative thereof, wherein L$^1$ is a linking group and R$^1$ is selected from the group consisting of $C_{1-20}$-alkyl, $C_{5-8}$-cycloalkyl, $C_{6-10}$-aryl and $C_{7-20}$-aralkyl, 5 to 60 weight % of at least one diacid (1ii) or derivative thereof, 0 to 30 weight % of at least one polyacid (1iii) carrying at least three COOH groups or derivative thereof, 5 to 50 weight % of at least one diol (1iv), 5 to 50 weight % of at least one polyol (1v) carrying at least three OH groups and 0 to 20 weight % of at least compound (1vi) comprising at least one epoxy group, based on the weight of the sum of (1i), (1ii), (1iii), (1iv) (1v) and (1vi).

4. The aqueous self-crosslinkable polyurethane dispersion of claim 3 comprising 5 to 90 weight % of at least one polyurethane carrying at least one keto-type C═O group, 0.01 to 20 weight % of at least one compound carrying at least two keto-type C═O group reactive groups, and 20 to 95 weight % of water, and 0 to 5 weight % of organic solvent, based on the total weight of the dispersion, wherein the at least one polyurethane carrying at least one keto-type C═O group comprises units derived from the at least one polyester polyol.

5. The aqueous self-crosslinkable polyurethane dispersion of claim 3, wherein the polyurethane carrying at least one keto-type C—O group comprises units derived from the at least one polyester polyol, at least one polymeric polyol (2i) different from the at least one polyester polyol, at least one polyol (2ii) having a molecular weight of below 400 g/mol, at least one polyol (2iii), different from the at least one polymeric polyol (2i) and the at least one polyol (2ii), carrying at least one acidic group or a salt thereof, optionally at least one alcohol or polyol (2iv), different from the at least one polymeric polyol (2i), the at least one polyol (2ii), and the at least one polyol (2iii), carrying at least one olefinically unsaturated group, at least one polyisocyanate (2v), at least one polyamine (2vi) carrying at least two amino groups independently selected from the group consisting of primary and secondary amino groups, and optionally at least one compound (2vii) carrying at least one olefinically unsaturated group and no NCO reactive groups.

6. The aqueous self-crosslinkable polyurethane dispersion of claim 3, wherein the polyurethane (2) carrying at least one keto-type C═O group comprises units derived from 1 to 40 weight % of the at least one polyester polyol, 5 to 70 weight % of at least one polymeric polyol (2i) different from the at least one polyester polyol, 1 to 30 weight % of at least one polyol (2ii) having a molecular weight of below 400 g/mol, 0.5 to 20 weight % of at least one polyol (2iii), different from the at least one polymeric polyol (2i) and the at least one polyol (2ii), carrying at least one acidic group, or a salt thereof, 0 to 30 weight % of at least one alcohol or polyol (2iv), different from the at least one polymeric polyol (2i), the at least one polyol (2ii), and the at least one polyol (2iii), carrying at least one olefinically unsaturated group, 10 to 80 weight % of at least one polyisocyanate (2v), 0.1 to 10 weight % of at least one polyamine (2vi) carrying at least two amino groups independently selected from the group consisting of primary and secondary amino groups, and 0 to 20 weight % of at least one compound (2vii) carrying at least one olefinically unsaturated group and no NCO reactive groups, based on the weight of the sum of the at least one polyester polyol, (2i) (2ii), (2iii), (2iv), (2v), (2vi) and (2vii).

7. The aqueous self-crosslinkable polyurethane dispersion of claim 3, wherein compound (3) is a compound carrying at least two keto-type C═O group reactive groups selected from the group consisting of —C(═O)—N($R^2$)H—$NH_2$ and —N($R^2$)—$NH_2$, wherein $R^2$ is selected from the group consisting of hydrogen, $C_{1-20}$-alkyl, $C_{5-8}$-cycloalkyl, $C_{6-10}$-aryl and $C_{7-20}$-aralkyl.

8. The aqueous self-crosslinkable polyurethane dispersion of claim 3, wherein compound (3) is a compound carrying at least two keto-type C—O group reactive groups, which are —C(═O)—N($R^2$)—$NH^2$ groups, wherein $R^2$ is selected from the group consisting of hydrogen, $C_{1-20}$-alkyl, $C_{5-8}$-cycloalkyl, $C_{6-10}$-aryl and $C_{7-20}$-aralkyl.

9. An aqueous self-crosslinkable polyurethane coating composition comprising the aqueous self-crosslinkable polyurethane dispersion (SC-PUD) of claim 3 optionally at least one second organic solvent (5), at least one coating composition additive (6), optionally at least one polymer (7) different from the polyurethane (2), and optionally at least one monomer (8) carrying at least one olefinically unsaturated group.

10. The aqueous self-crosslinkable polyurethane coating composition of claim 9 comprising 50 to 99 weight % of the aqueous self-crosslinkable polyurethane dispersion, 0 to 10 weight % of the at least one second organic solvent, 0.1 to 10 weight % of the at least one coating composition additive, 0 to 50 weight % of the at least one polymer different from the polyurethane, and 0 to 40 weight % of the at least one monomer carrying at least one olefinically unsaturated group, based on the total weight of the aqueous self-crosslinkable polyurethane coating composition.

11. A substrate coated with the aqueous self-crosslinkable polyurethane coating composition of claim 9.

12. The substrate of claim 11, wherein the substrate is wood.

13. A process for coating the substrate of claim 11, comprising applying the aqueous self-crosslinkable polyurethane coating composition to the substrate.

* * * * *